(12) United States Patent
Graushar et al.

(10) Patent No.: US 9,607,249 B2
(45) Date of Patent: *Mar. 28, 2017

(54) SYSTEM AND METHOD FOR ADDING DATA TO A PRINTED PUBLICATION

(71) Applicant: Quad/Graphics, Inc., Sussex, WI (US)

(72) Inventors: William T. Graushar, Elm Grove, WI (US); John A. Barndt, Oconomowoc, WI (US); Robert H. Barton, Jr., Waukesha, WI (US); Terrill Scott Clayton, Elm Grove, WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/707,843

(22) Filed: May 8, 2015

(65) Prior Publication Data

US 2015/0243020 A1  Aug. 27, 2015

Related U.S. Application Data

(63) Continuation of application No. 14/107,088, filed on Dec. 16, 2013, now Pat. No. 9,047,542, which is a
(Continued)

(51) Int. Cl.
*G06K 15/02* (2006.01)
*H04N 1/00* (2006.01)
(Continued)

(52) U.S. Cl.
CPC ............... *G06K 15/02* (2013.01); *B41M 5/24* (2013.01); *B41M 7/0009* (2013.01);
(Continued)

(58) Field of Classification Search
None
See application file for complete search history.

(56) References Cited

U.S. PATENT DOCUMENTS

| 4,861,620 A | 8/1989 | Azuma et al. |
| 4,958,233 A | 9/1990 | Okino |

(Continued)

FOREIGN PATENT DOCUMENTS

| EP | 1 657 072 A2 | 5/2006 |
| JP | 08-067068 | 3/1996 |

(Continued)

OTHER PUBLICATIONS

Advanced Vision Technology Ltd. (AVT), ProoFit—A Quality Assurance and Verification Solution for the Printing Industry, printed at Internet address: http://www.avt-inc.com/files/documents/138.pdf, on Feb. 26, 2009, 2 pages.

(Continued)

*Primary Examiner* — Scott A Rogers
(74) *Attorney, Agent, or Firm* — Foley & Lardner LLP

(57) ABSTRACT

Systems and methods for adding data to a printed publication are provided. One method includes receiving variable data and controlling an energy source to at least partially ablate the printed publication based on the variable data. The printed publication is printed on the substrate using the commercial printing press based on fixed data. Controlling the energy source to at least partially ablate the printed publication includes, after the printed publication has been printed on the substrate by the commercial printing press based on the fixed data, controlling the energy source to remove a portion of the printed publication based on the variable data.

20 Claims, 16 Drawing Sheets

Related U.S. Application Data continuation of application No. 13/398,729, filed on Feb. 16, 2012, now Pat. No. 8,625,152, which is a continuation of application No. 12/275,085, filed on Nov. 20, 2008, now Pat. No. 8,120,811.

(60) Provisional application No. 61/003,991, filed on Nov. 21, 2007.

(51) Int. Cl.

| | |
|---|---|
| *G06F 3/12* | (2006.01) |
| *B41M 5/24* | (2006.01) |
| *B41M 7/00* | (2006.01) |
| *H04N 1/23* | (2006.01) |
| *H04N 1/32* | (2006.01) |
| *H04N 1/50* | (2006.01) |

(52) U.S. Cl.
CPC ......... *B41M 7/0081* (2013.01); *G06F 3/1208* (2013.01); *G06F 3/1215* (2013.01); *G06F 3/1243* (2013.01); *G06F 3/1251* (2013.01); *G06F 3/1282* (2013.01); *G06K 15/021* (2013.01); *G06K 15/022* (2013.01); *G06K 15/029* (2013.01); *H04N 1/00278* (2013.01); *H04N 1/2384* (2013.01); *H04N 1/32101* (2013.01); *H04N 1/50* (2013.01)

(56) References Cited

U.S. PATENT DOCUMENTS

| | | |
|---|---|---|
| 4,984,948 A | 1/1991 | Lindsay et al. |
| 4,985,290 A | 1/1991 | Lewis et al. |
| 5,002,852 A | 3/1991 | Lewis et al. |
| 5,008,709 A | 4/1991 | Shinada et al. |
| 5,104,767 A | 4/1992 | Nakamura |
| 5,137,964 A | 8/1992 | Lewis et al. |
| 5,139,928 A | 8/1992 | Lewis |
| 5,147,787 A | 9/1992 | Lewis et al. |
| 5,166,703 A | 11/1992 | Watanabe et al. |
| 5,232,820 A | 8/1993 | Lewis et al. |
| 5,241,328 A | 8/1993 | Sarraf et al. |
| 5,262,470 A | 11/1993 | Shimotsuma et al. |
| 5,329,300 A | 7/1994 | Nishiyama |
| 5,340,628 A | 8/1994 | McKillip |
| 5,513,117 A | 4/1996 | Small |
| 5,561,604 A | 10/1996 | Buckley et al. |
| 5,576,377 A | 11/1996 | El Sayed et al. |
| 5,625,402 A | 4/1997 | Sarraf |
| 5,633,118 A | 5/1997 | Burberry et al. |
| 5,633,119 A | 5/1997 | Burberry et al. |
| 5,645,920 A | 7/1997 | Nishiyama |
| 5,703,709 A | 12/1997 | Mori et al. |
| 5,731,112 A | 3/1998 | Lewis et al. |
| 5,769,457 A | 6/1998 | Warther |
| 5,855,969 A | 1/1999 | Robertson |
| 5,960,412 A | 9/1999 | Tackbary et al. |
| 6,039,356 A | 3/2000 | Warther et al. |
| 6,058,384 A | 5/2000 | Pierce et al. |
| 6,077,810 A | 6/2000 | Imaeda |
| 6,078,713 A | 6/2000 | Tausch et al. |
| 6,107,010 A | 8/2000 | Corniglion et al. |
| 6,125,760 A | 10/2000 | Graushar et al. |
| 6,133,342 A | 10/2000 | Mizobuchi et al. |
| 6,139,914 A | 10/2000 | Suzuki et al. |
| 6,161,971 A | 12/2000 | Suzuki et al. |
| 6,167,326 A | 12/2000 | Graushar et al. |
| 6,169,266 B1 | 1/2001 | Hughes |
| 6,177,578 B1 | 1/2001 | Lewis et al. |
| 6,207,240 B1 | 3/2001 | Schoenfeld et al. |
| 6,243,161 B1 | 6/2001 | Suzuki et al. |
| 6,267,366 B1 | 7/2001 | Graushar et al. |
| 6,269,609 B2 | 8/2001 | Graushar et al. |
| 6,302,388 B1 | 10/2001 | Graushar et al. |
| 6,305,716 B1 | 10/2001 | Warther et al. |
| 6,372,394 B1 | 4/2002 | Zientek |
| 6,372,819 B1 | 4/2002 | Mizobuchi et al. |
| 6,411,323 B1 | 6/2002 | Waarts et al. |
| 6,429,889 B1 | 8/2002 | Murokh |
| 6,436,600 B1 | 8/2002 | Suzuki et al. |
| 6,478,861 B1 | 11/2002 | Kwan et al. |
| 6,486,905 B2 | 11/2002 | Suzuki et al. |
| 6,548,222 B2 | 4/2003 | Teng |
| 6,566,039 B1 | 5/2003 | Teng |
| 6,614,023 B2 | 9/2003 | Focke et al. |
| 6,670,981 B1 | 12/2003 | Vincent et al. |
| 6,675,062 B2 | 1/2004 | Graushar et al. |
| 6,692,895 B2 | 2/2004 | Huang et al. |
| 6,745,693 B2 | 6/2004 | Teng |
| 6,791,592 B2 | 9/2004 | Assa et al. |
| 6,801,750 B2 | 10/2004 | Kawahira |
| 6,829,000 B2 | 12/2004 | Assa et al. |
| 6,888,095 B2 | 5/2005 | Khan |
| 6,935,748 B2 | 8/2005 | Kaufman et al. |
| 6,936,358 B2 | 8/2005 | Kume et al. |
| 6,963,007 B2 | 11/2005 | Hays et al. |
| 7,017,492 B2 | 3/2006 | Seymour |
| 7,021,549 B2 | 4/2006 | O'Rell et al. |
| 7,089,420 B1 | 8/2006 | Durst et al. |
| 7,089,856 B2 | 8/2006 | Teng |
| 7,096,088 B2 | 8/2006 | Graushar et al. |
| 7,106,469 B2 | 9/2006 | Simpson et al. |
| 7,136,191 B2 | 11/2006 | Kaltenbach et al. |
| 7,146,909 B2 | 12/2006 | Oohashi et al. |
| 7,162,035 B1 | 1/2007 | Durst et al. |
| 7,167,194 B2 | 1/2007 | Assa et al. |
| 7,168,472 B2 | 1/2007 | Hirst et al. |
| 7,187,396 B2 | 3/2007 | Carroll et al. |
| 7,199,911 B2 | 4/2007 | Hudson et al. |
| 7,217,500 B2 | 5/2007 | Kunita et al. |
| 7,220,479 B2 | 5/2007 | Lutz et al. |
| 7,264,916 B2 | 9/2007 | Heneghan et al. |
| 7,268,795 B2 | 9/2007 | Taugher et al. |
| 7,270,929 B2 | 9/2007 | Kwasny et al. |
| 7,311,954 B2 | 12/2007 | Koops et al. |
| 7,763,179 B2 | 7/2010 | Levy et al. |
| 8,251,404 B2 | 8/2012 | Depta et al. |
| 2002/0177065 A1 | 11/2002 | Sahi |
| 2003/0180660 A1 | 9/2003 | Khan |
| 2004/0043171 A1 | 3/2004 | Audett |
| 2004/0173958 A1 | 9/2004 | Graushar |
| 2004/0218995 A1 | 11/2004 | Graushar |
| 2005/0003297 A1 | 1/2005 | Labrec |
| 2005/0032957 A1 | 2/2005 | Khan et al. |
| 2005/0036229 A1 | 2/2005 | Taniguchi et al. |
| 2005/0077670 A1 | 4/2005 | Graushar et al. |
| 2005/0095408 A1 | 5/2005 | LaBrec et al. |
| 2005/0097866 A1 | 5/2005 | Hudetz |
| 2005/0099657 A1 | 5/2005 | Hudetz |
| 2005/0102057 A1 | 5/2005 | Graushar et al. |
| 2005/0118537 A1 | 6/2005 | Lutz et al. |
| 2005/0160362 A1 | 7/2005 | Obradovic et al. |
| 2005/0170282 A1 | 8/2005 | Inno et al. |
| 2005/0186511 A1 | 8/2005 | Khan |
| 2005/0211371 A1 | 9/2005 | Hirst et al. |
| 2005/0212828 A1 | 9/2005 | Kunschke |
| 2005/0231585 A1 | 10/2005 | Mudigonda et al. |
| 2005/0233251 A1 | 10/2005 | Kakino et al. |
| 2005/0255406 A1 | 11/2005 | Assa |
| 2005/0269304 A1 | 12/2005 | Khan et al. |
| 2005/0271981 A1 | 12/2005 | Oohashi et al. |
| 2006/0032957 A1 | 2/2006 | Kolbet et al. |
| 2006/0040217 A1 | 2/2006 | Stubbs |
| 2006/0055975 A1 | 3/2006 | Toda |
| 2006/0071407 A1 | 4/2006 | Graushar et al. |
| 2006/0075916 A1 | 4/2006 | Edwards et al. |
| 2006/0088355 A1 | 4/2006 | Ribi |
| 2006/0141391 A1 | 6/2006 | Klein et al. |
| 2006/0147842 A1 | 7/2006 | Khan |
| 2006/0190125 A1 | 8/2006 | Stemmle |
| 2006/0196936 A1 | 9/2006 | Christofferson et al. |
| 2006/0228515 A1 | 10/2006 | Kwasny et al. |
| 2006/0239510 A1 | 10/2006 | Tatarczyk et al. |

(56) References Cited

U.S. PATENT DOCUMENTS

| | | |
|---|---|---|
| 2006/0259182 A1 | 11/2006 | Mantell |
| 2007/0063332 A1 | 3/2007 | Go et al. |
| 2007/0064234 A1 | 3/2007 | Tatarczyk et al. |
| 2007/0068630 A1 | 3/2007 | Griffin et al. |
| 2007/0092836 A1 | 4/2007 | Inno et al. |
| 2007/0095232 A1 | 5/2007 | Teng |
| 2007/0100492 A1 | 5/2007 | Idaka et al. |
| 2007/0216918 A1* | 9/2007 | Honeck .......... H04N 1/56 358/1.9 |
| 2007/0240592 A1 | 10/2007 | Ronecker et al. |
| 2007/0252006 A1 | 11/2007 | Heck et al. |
| 2007/0254241 A1 | 11/2007 | Teng |
| 2007/0281027 A1 | 12/2007 | Audett |
| 2008/0026319 A1 | 1/2008 | Stroh et al. |

FOREIGN PATENT DOCUMENTS

| | | |
|---|---|---|
| WO | WO-02/068205 | 9/2002 |
| WO | WO-02/074548 | 9/2002 |
| WO | WO-03/055684 | 7/2003 |
| WO | WO-2004/043704 | 5/2004 |
| WO | WO-2005/012442 A1 | 2/2005 |
| WO | WO-2005/068207 A1 | 7/2005 |
| WO | WO-2006/018640 A1 | 2/2006 |
| WO | WO-2006/051309 A1 | 5/2006 |
| WO | WO-2006/114594 | 11/2006 |
| WO | WO-2006/114600 A1 | 11/2006 |
| WO | WO-2006/129078 | 12/2006 |
| WO | WO-2006/129086 | 12/2006 |
| WO | WO-2007/039715 | 4/2007 |
| WO | WO-2007/045912 | 4/2007 |
| WO | WO-2007/054692 | 5/2007 |
| WO | WO-2007/063332 A2 | 6/2007 |
| WO | WO-2007/063339 | 6/2007 |
| WO | WO-2008/013420 A1 | 1/2008 |

OTHER PUBLICATIONS

Applications: Free Radical Initiators, Thermal Initiators: Decomposition Rate and Half-Life, 2 pages.

EyeC, EyeC Print Inspection, printed at Internet address: http://www.print-inspection.com/ on Feb. 26, 2009, 1 page.

International Search Report and Written Opinion of International Application PCT/US2008/084133 mailing date May 29, 2009, 8 pages.

Notice of Allowance for U.S. Appl. No. 12/275,085, mail date Oct. 17, 2011, 7 pages.

Notice of Allowance for U.S. Appl. No. 13/398,729, mail date Aug. 29, 2013, 6 pages.

Office Action for U.S. Appl. No. 12/275,085, mail date Jul. 20, 2011, 9 pages.

Office Action for U.S. Appl. No. 13/398,729, mail date Apr. 15, 2013, 9 pages.

Office Action for U.S. Appl. No. 13/398,729, mail date Oct. 5, 2012, 11 pages.

TCI Europe, Materials Chemistry Product Information, Pressure & Heat Sensitive Recording Materials, printed from Internet address: http://www.tcieurope.eu/en/product/materials-chem/F016.shtml on Feb. 20, 2009, 7 pages.

The Domino DDC3, Domino Amjet Inc., printed at Internet address:http://www.domino-printing.com/uk%2Ffilestore%2FDDC3%5Fsheet%2Epdf on Feb. 20, 2009, 2 pages.

US Notice of Allowance DTD Jan. 20, 2015.

US Office Action DTD Sep. 10, 2014.

Videojet Technologies Inc., Videojet 3320, Laser Marking System, 2 pages.

* cited by examiner

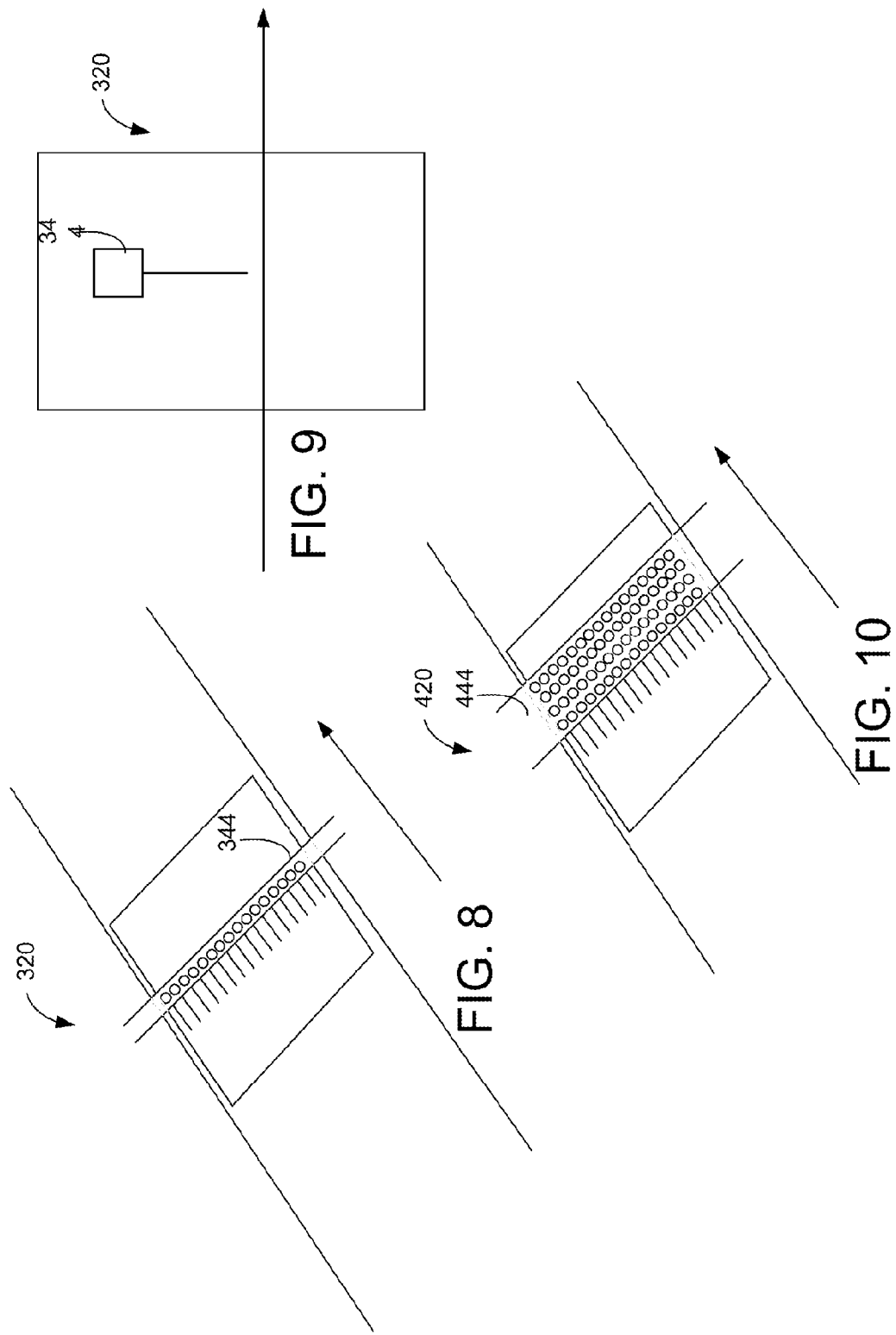

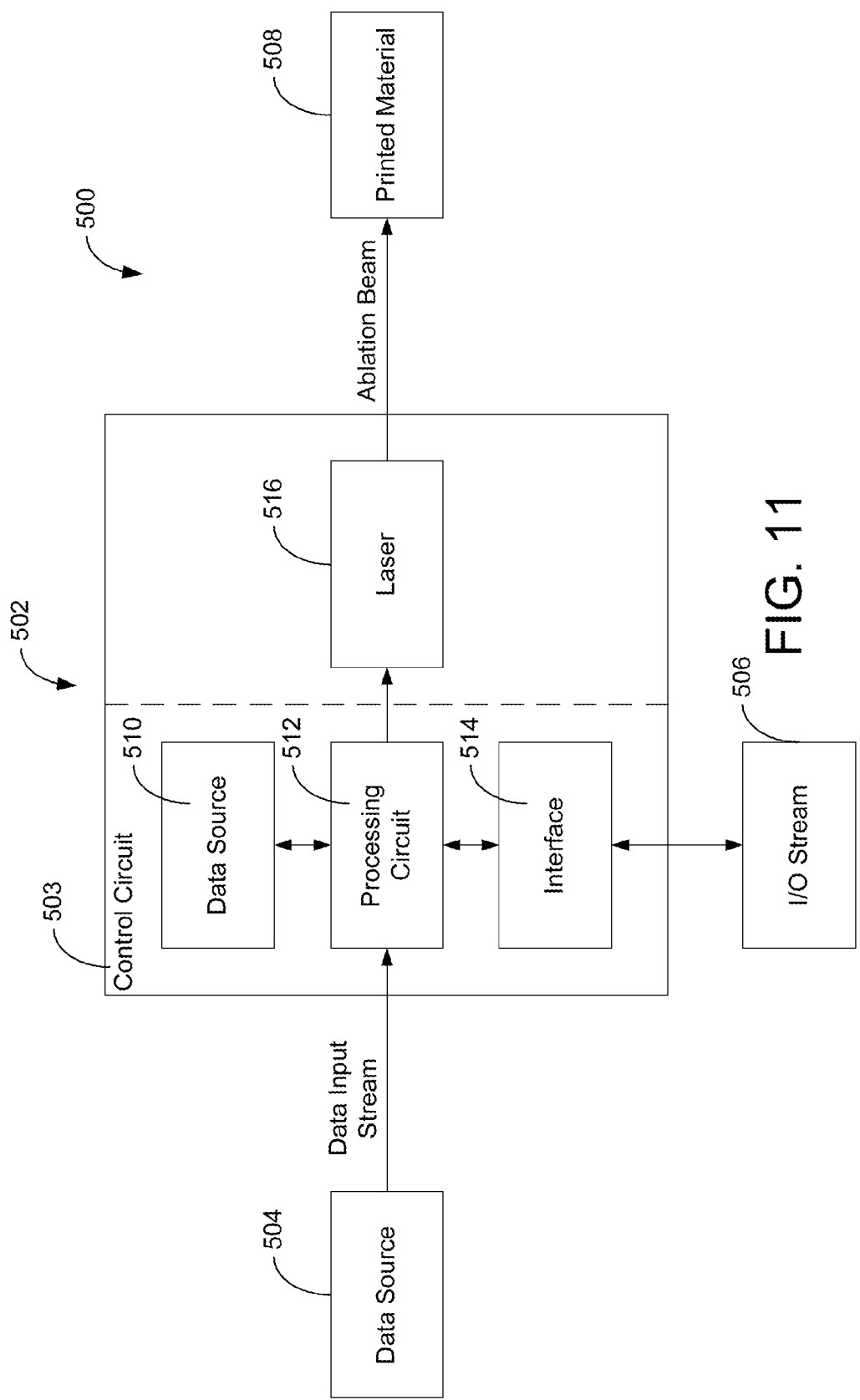

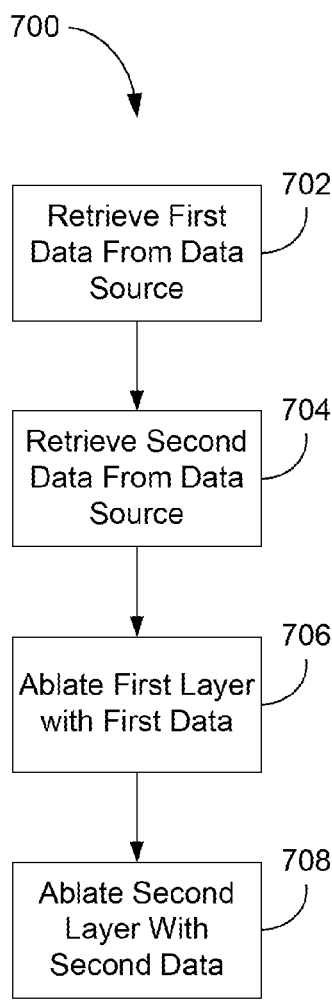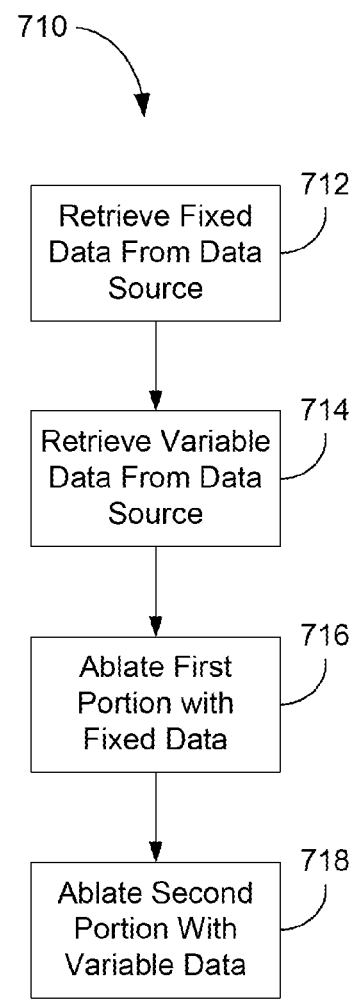
FIG. 13
FIG. 14

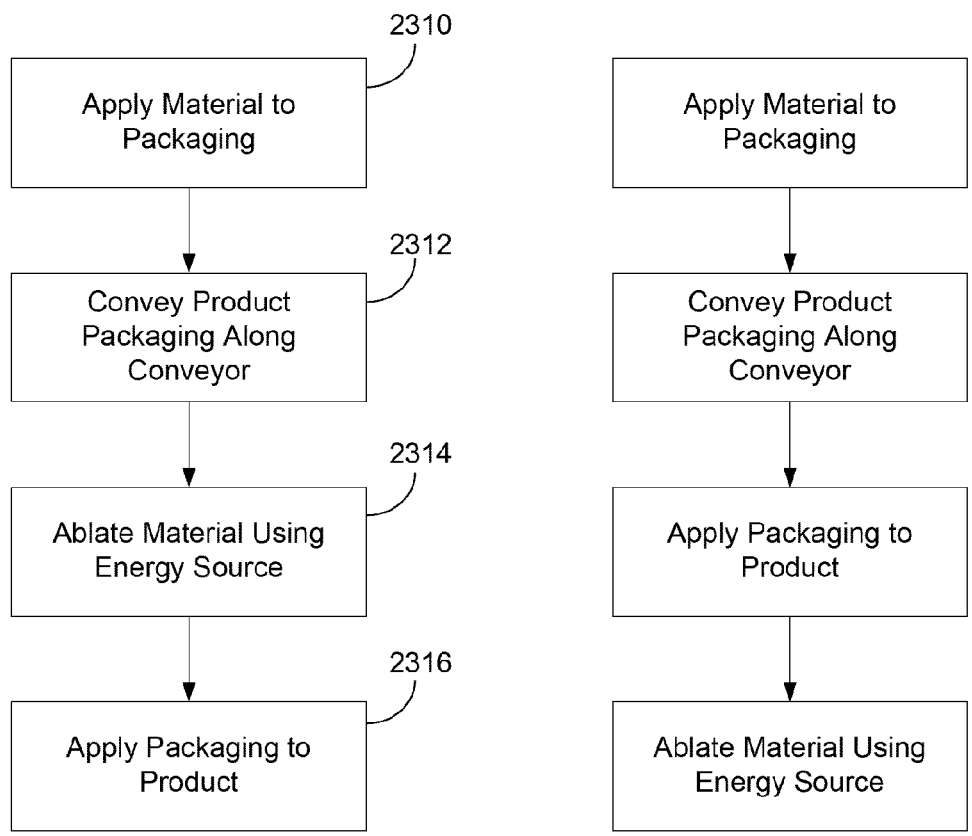

SYSTEM AND METHOD FOR ADDING DATA TO A PRINTED PUBLICATION

CROSS-REFERENCE TO RELATED APPLICATIONS

This application is a continuation of U.S. patent application Ser. No. 14/107,088, filed Dec. 16, 2013, titled "System and Method for Adding Data to a Printed Publication," which is a continuation of U.S. patent application Ser. No. 13/398,729, filed Feb. 16, 2012, titled "System and Method for Adding Data to a Printed Publication," which is a continuation of U.S. patent application Ser. No. 12/275,085, filed Nov. 20, 2008, titled "System and Method for Adding Data to a Printed Publication," which claims priority to U.S. Provisional Patent Application No. 61/003,991, filed Nov. 21, 2007, titled "Laser printing using ablation," all of which are incorporated herein by reference in their entireties.

FIELD

The present disclosure relates generally to the field of printing, such as commercial printing. The disclosure more specifically relates to printing fixed and variable data by using a laser to ablate at least a portion of a layer.

BACKGROUND

Current commercial printing technology generally employs planographic (e.g., offset, lithography, collatype, screenless), relief (e.g., letterpress and flexography), intaglio (e.g., gravure and steel die engraving), porous (e.g., screen printing and stencil), reprography (e.g., copying and duplicity) and digital (e.g., ink jets and toner) methods of print.

Commercial printing can include fixed data printing followed by variable data printing (VDP) employing an ink jet system. The fixed data printing can be performed using current commercial printing technology, such as high quality high speed four color printing press-based processes like web-offset. Today, variable data printing is often performed in the post-press process (e.g., after the fixed data is applied to a substrate) or as part of tasks related to personalization, mailing or delivery. The variable data printing can be used to print codes, messages, images and other data unique to an item or group of items printed. For example, the variable data may comprise codes that can include batch or serial numbers, addresses for recipients of the items, names, personalized messages, advertising, consumer specific coupons, etc. Traditionally, ink jet systems are most commonly used to print the variable data. The ink jet systems used for variable data printing are often slower than the higher-speeds of the fixed data printing systems, which thus requires the printed materials to be transferred "off-line" to a different variable printing line or the use of high cost equipment such as accumulators or buffers to process the materials "in-line." Further, the manufacturer must continue to buy the ink long after purchasing the ink jet, resulting in an ongoing manufacturing expense. Yet further, the ink jet heads often become clogged and damaged, requiring labor and replacement costs. Additionally, the toxicity of some ink adds additional manufacturing complexity. Additionally, the ink jet systems have other drawbacks that may hinder performance of the overall printing process, as discussed above.

Alternatively, a printing line can utilize an entirely plateless printing process and perform fixed and variable data printing in a single line. Such systems rely on ink jets, electrophotography, ion or electron charge deposition, etc. As discussed above, such systems have drawbacks.

SUMMARY

One embodiment of the disclosure relates to a method of adding data to a printed publication printed on a substrate by a commercial printing press as the substrate travels through the commercial printing press. The method includes receiving variable data. The variable data includes, for a print run during which a plurality of copies of the printed publication are printed, data changed between at least two of the copies. The method further includes controlling an energy source to at least partially ablate the printed publication based on the variable data. The printed publication is printed on the substrate using the commercial printing press based on fixed data. The fixed data includes data common to all of the copies of the printed publication printed during the print run. Controlling the energy source to at least partially ablate the printed publication includes, after the printed publication has been printed on the substrate by the commercial printing press based on the fixed data, controlling the energy source to remove a portion of the printed publication based on the variable data.

Another embodiment relates to a system for adding data to a printed publication printed on a substrate. The system includes a processing circuit and an energy source. The processing circuit is configured to receive variable data and to control the energy source to at least partially ablate the printed publication based on the variable data. The variable data includes, for a print run during which a plurality of copies of the printed publication are printed, data changed between at least two of the copies. The publication is printed by a commercial printing press as the substrate travels through the commercial printing press based on fixed data. The fixed data includes data common to all of the copies of the printed publication printed during the print run. After the printed publication has been printed on the substrate by the commercial printing press based on the fixed data, the processing circuit is configured to control the energy source to remove a portion of the printed publication based on the variable data.

Yet another embodiment relates to a printed publication generated using a process. The process includes receiving variable data. The variable data includes, for a print run during which a plurality of copies of the printed publication are printed, data changed between at least two of the copies. The process further includes controlling an energy source to at least partially ablate the printed publication based on the variable data. The printed publication is printed on the substrate using the commercial printing press based on fixed data. The fixed data includes data common to all of the copies of the printed publication printed during the print run. Controlling the energy source to at least partially ablate the printed publication includes, after the printed publication has been printed on the substrate by the commercial printing press based on the fixed data, controlling the energy source to remove a portion of the printed publication based on the variable data.

BRIEF DESCRIPTION OF THE DRAWINGS

FIG. 8 is a perspective schematic view of an optical matrix laser printing apparatus configuration, according to one exemplary embodiment.

FIG. 9 is a side plan view of the optical matrix printing configuration of FIG. 8, according to one exemplary embodiment.

FIG. 10 is a perspective schematic view of an optical matrix variable data printer configuration, according to an exemplary embodiment.

FIG. 11 is a schematic block diagram of an ablation system according to an exemplary embodiment.

FIG. 13 is a process flow diagram of a method for ablating data with the system of FIG. 10 according to an exemplary embodiment.

FIG. 14 is a process flow diagram of a method for ablating fixed and variable data with the system of FIG. 10 according to an exemplary embodiment.

FIG. 23 is a process flow diagram of a method for printing data on packaging with the system of FIG. 19 on the packaging line of FIG. 16 according to an exemplary embodiment.

FIG. 24 is a process flow diagram of a method for printing data on packaging with the system of FIG. 19 on the packaging line of FIG. 16 according to another exemplary embodiment.

FIG. 25 is a process flow diagram of a method for printing data on packaging with the system of FIG. 19 on the packaging line of FIG. 16 according to another exemplary embodiment.

DETAILED DESCRIPTION OF EXEMPLARY EMBODIMENTS

Figure 1:
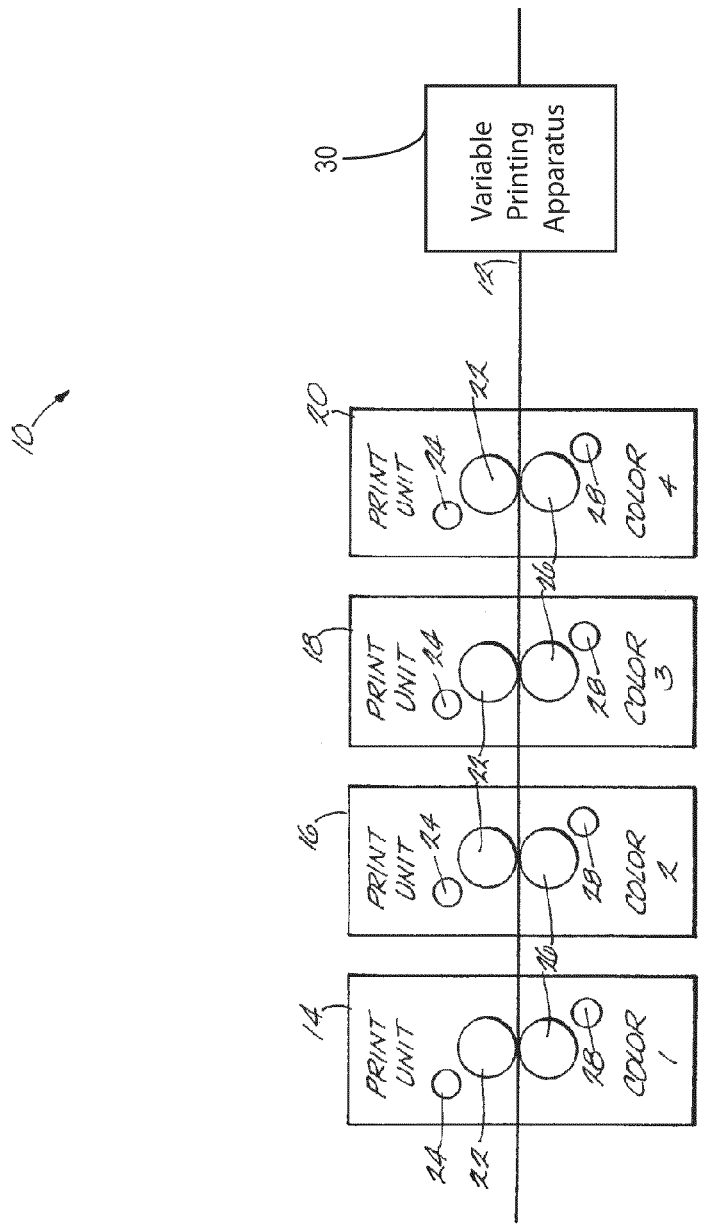
FIG. 1 is a schematic block diagram of a printing line according to one exemplary embodiment.

Embodiments described herein can provide an improved printing process for fixed and/or variable printing; provide a combination of a higher speed fixed and/or variable data printing process with a high speed, high quality fixed and/or variable data printing process; provide an efficient, high quality, high speed, high resolution fixed and/or variable printing apparatus and process; provide a non-ink based fixed and/or variable data printing process. Yet further, various embodiments can provide a fixed and/or variable data printing process that can be integrated into a high speed, four color printing press operation.

Printing Overview

Data, both variable and fixed, may be marked or otherwise printed on a substrate (e.g., a generally flexible substrate, a generally stiff substrate, a semi-rigid substrate, etc.) or printed material (e.g., a web, which may be continuous, sheets of paper, paper which may be coated or uncoated, a printed publication or other printed material, etc.) at any point during a commercial printing process, including on a printing and/or a finishing line. The substrate may be made from a variety of materials including, without limitation, paper, plastic, metal, laminate, or any combination thereof. Printed publications may include any printed media intended for distribution typically by mailing, to a wide audience, such as hundreds, thousands, or more. Examples of types of printed publications may include catalogs, magazines, bound and unbound advertisements, newspapers, direct marketing and mailing pieces, inserts, onserts, signatures or forms used to make any of the above, etc.

In exemplary embodiments where the substrate is packaging, the packaging may generally be any material used to pack or label something, for example a box, carton, bag, tag, label, can, or bottle to package a product. In some exemplary embodiments, the packaging may be substantially non-flat, such as bottles, cans, or other materials having substantial sizes in three dimensions. The packaging may enclose or substantially enclose a product and may have opaque, transparent, and/or translucent portions. The packaging may have dimensions greater than about 0.02 inches in all three dimensions, greater than about 0.2 inches in all three dimensions, greater than about 2 inches in all three dimensions, any combination thereof, or other thicknesses. According to other exemplary embodiments, the packaging may be substantially flat, such as paper, cardboard, or plastic cards. In some exemplary embodiments, the packaging may be substantially flat at one step in a process and become substantially non-flat at a second step in a process (e.g., where cardboard is formed into a box), and printing may occur at either step of the process. For example, a plastic packaging may be applied to a package of meat, whereby the packaging becomes substantially non-flat due to the non-flat surfaces of the meat, and printing is applied to the plastic in its non-flat form. In various exemplary embodiments including substantially flat or non-flat packaging, the packaging may be composed of paper, cardboard, plastic, metal, wood, glass, fabric or fibrous material, foam, rubber, another material, or any combination thereof.

Packaging generally includes discrete primary, secondary, and/or tertiary packaging units. For purposes of this disclosure, "primary packaging" may be a packaging unit that is in contact with the product, that first envelops and holds the product, or that is the smallest unit of distribution or use in the packaging. For purposes of this disclosure, "secondary packaging" may be a packaging unit that is outside the primary packaging, that is in contact with the primary packaging, or that is used to group primary packaging together. For purposes of this disclosure, "tertiary packaging" may be a packaging unit that is used for bulk handling, warehouse storage, or transport shipping (e.g., a palletized unit load that packs into containers) or that is in contact with the secondary packaging and/or the primary packaging. According to various exemplary embodiments, the packaging may substantially cover the product to be packaged.

According to another exemplary embodiment, variable data may comprise information printed on product packaging representing product numbering, naming, expiration information, customization information, shipping or mailing information, or other information related to a product to be packaged.

For purposes of this disclosure, "fixed data" may be any common information added or printed to multiple printed materials that does not change for each printed material. This fixed data may include data that forms graphical or textual information. Under some circumstances, fixed data may also include machine readable indicia such as a barcode, a name, a location, a number, a graphic, text, advertisement, article, or any other information that may be commonly printed on multiple printed materials so long as meeting the meaning of fixed data.

"Variable data" may comprise elements such as text, a graphic, image, data or information which may be changed from one print operation to the next or from one series of print operations to the next, or a combination thereof. Variable data may be received from a database, external file, memory, or other data source. In some embodiments, variable data may be changed without stopping or slowing down the printing process. The term variable data may be used to refer to data stored in a memory, to the indicia printed on the printed material based on the data stored in the memory, or to data represented in any other form. Variable data may be used to determine which of other variable data is to be printed on a substrate (e.g., demographic data may be used to determine which of different variable data advertisements to print) or variable data may represent the data that actually gets printed (e.g., the advertisement).

Variable data may include or be based on geographic, demographic, postal, personal, and/or book data or any combination of these types of information and other types of information not specifically identified here. Geographic information may include address data, regional data, state data, country data, language data, or other types of geographical or census data for each piece of printed material. Demographic data may include any data about the recipient or subscriber or class of recipients or subscribers of the printed media including personal data which may be used by a printing device configured to print personalized content on the printed media during a finishing operation as well as information based upon region, country, state, etc. Postal information may comprise any information useful to a postal delivery service or useful in taking advantage of the features offered by a postal delivery service including postal class data (e.g., as first class, second class, third class, standard, flat rate, and priority), private mailing services data (e.g., for FedEx, UPS, DHL, etc.), postal delivery information or sort information (e.g., carrier route number), zip code (e.g., 3 or 5 digit zip code data), sectional center facility (SCF) information, or any other geographic or postal rate data. Personal data may include age data, purchasing history data, buying habit data, income data, race or ethnicity data, sex data, religious data, hobby data, or any other data about a person or class of persons. Book data may include information about the book, magazine, catalog, signature, or other printed material being assembled including the title of the printed material, size data representing a size of at least one dimension of the printed media (e.g., a length to be trimmed, a length post-trim, lengths or widths, or locations/coordinates at which to set a knife or blade for trimming, etc.), page count, publisher, version, or any other information about the book, magazine, catalog, signature or other printed media being assembled. The variable data may be used, for example, to tailor advertisements or may also include billing information that may be provided on billing forms. In addition to using ablation to add information to a substrate or printed publication, information may also or alternatively be removed from a substrate or printed publication using ablation, for example to remove certain information in an advertisement which is not applicable to a particular recipient.

According to one example, variable data may comprise a map, text, and/or graphics related to a retail store or stores or dealer in the vicinity of an address of a recipient of a printed publication. The map, text, and/or graphics may provide turn-by-turn directions, store address, store phone number, store hours, and/or other information relating to the retail store.

According to another example, variable data may comprise machine-readable indicia (e.g., bar codes, etc.) representing certain data or other information, for example address data, universal product code (UPC) data, price data, or other data.

According to another example, variable data may be demographic or geographic data used in a printing system to determine which of a plurality of advertisements to print in a printed publication. For example, the printing system may select one of a plurality of advertisements associated with different income levels, gender, age ranges, or other demographic or geographic data and print the advertisements in the printed publication associated with the relevant demographic or geographic data.

According to another example, variable data may comprise information printed on a printed publication (e.g., in a header or footer or other location of a printed publication) representing an advertisement for a particular dealer or retail location based on a particular region to which the publication is being distributed or mailed.

For purposes of this disclosure, a "printing line" may be any type of printing press application. For example, a printing line may include offset or gravure applications where at least one layer is applied via a printing blanket or plate or via a cylinder using one or more printing units (e.g., cyan, magenta, yellow, and black printing units), or alternatively a digital type press such as traditional or drop-on-demand ink jet technology presses.

For purposes of this disclosure a "finishing line" may be any in-line or off-line process performed on the printed material after the printing is applied (i.e., after the printing line). Such a process may include binding (e.g., with glue or another adhesive or binder), stitching (e.g., with wire or another stitching material), trimming, gathering, collating, varnishing, laminating, embossing, bronzing, die-stamping, folding, perforating, punching, round cornering, padding, tin-edging, addressing, mailing and/or sorting, slitting, or wrapping tasks or functions, or any combination thereof. It is noted that a printing line and finishing line may be combined in-line, at least in part, to perform both printing processes and finishing processes or they may be separate lines with the printed materials transferred from the printing line to the finishing line for further processing. In either an inline or offline finishing process a message, address, or other information that includes variable data may be included on blow-in material, bind-in material, stickers, onserts, inserts, tipons, or other printed materials.

According to various exemplary embodiments including packaging, the packaging can be printed with fixed data for substantially all discrete packaging units in a print run, with variable data for substantially all packaging units, or any combination of fixed and variable data. Labels can be printed with information and then applied to the product or other product packaging.

Ablation Overview

According to some exemplary embodiments, printing of data (e.g., text or graphics) may be accomplished using an energy source. An example of an energy source is a laser. Lasers may comprise, for example, a $CO_2$ laser, a fiber laser, a laser diode, a laser diode array, a YAG laser or any other laser with a power, wavelength, and other laser parameters to ablate at least a portion of a layer covering at least a portion of a substrate or another layer (e.g., multiple layers may cover a substrate). The layers, as they relate to commercial printing, may include an ink, a varnish, a glue or other adhesive, a black dye, or any other layer that may be removed by laser ablation, or any combination thereof. The layers may include or be mixed with an additive to facilitate ablation. Such additives may include carbon black pigment, infrared (IR) or near infrared (NIR) absorbers such as copper hydroxyl phosphate (CHP), copper hydroxide phosphate, tin oxide, and N,N,N',N'-Tetrakis(4-dibutylaminophenyl)-p-phenylene diaminium dehexafluoroantimonate, a conducting polymer such as Baytron P available from HC Starck of Newton, Mass., Iriodin LS820 available from Merck of Whitehouse Station, N.J., Pro-Jet 900NP available from Avecia of Cleveland, UK, or any other NIR absorber or other material that may facilitate laser ablation.

Ablation can be used to remove at least one layer from a surface, but may be used to ablate multiple layers. Ablation may take place by erosion, melting, evaporation, vaporization, or other physical removal via irradiation by a laser. Using this method, the laser can be used to reveal the background and, for instance, generate text and/or graphics on the printed media. For example, when producing a printed material having a layer comprising a certain color of ink, a laser may be used to ablate portions of the colored ink to reveal text and/or graphics (e.g., a personal message, other variable data, fixed data, etc.) by exposing portions of the underlying ink (or other layer) or substrate. The laser ablation technique may be used to ablate materials from any color or type of ink or from only a certain color or type of ink. According to other exemplary embodiments, the laser ablation technique may be used to ablate non-ink material from a printed material (e.g., varnish, a laser or ink jet printed section, a coated section of a printed material, a non-printed portion of paper, etc.). In other embodiments, the laser may ablate at least a portion of a layer to expose an underlying layer having a sensual feature, such as smell. The laser also may be used to ablate at least a portion of a layer to cause a textured look or feel to occur on the printed product. In another embodiment, the laser may ablate a layer to expose a metallic ink, other layer, or substrate (e.g., a metallic or textured substrate). In still other embodiments, the laser may ablate a layer with a glossy appearance (e.g., a varnish) to expose text, graphics, or a surface that has a matte appearance, or vice-versa.

Exemplary Lasers

One example of a suitable laser is a Videojet 3320 laser marking system commercially available from Videojet Technologies of Wood Dale, Ill. This laser marking system includes a sealed-off $CO_2$ laser rated at an output of 30 Watts and a 10.6 μm wavelength with a SHC 60 focusing lens. It is noted that according to other exemplary embodiments, other types of $CO_2$ lasers, fiber lasers, laser diodes, laser diode arrays, YAG lasers, arrays of other lasers (e.g., $CO_2$ lasers) or other lasers with sufficient power and fluence to ablate a layer may be used. In one exemplary embodiment, the laser may be at least a 20 Watt laser. Various types of exemplary lasers are included in the table below:

| Manufacturer | Part number | Power output | Laser technology | Wavelength |
|---|---|---|---|---|
| Videojet | 3320 | 30 Watts | CO2 | 10,600 nm |
| DataLase | FL20 | 20 Watts | Fiber | 1070 nm |
| Domino | DSL1 | 25 Watt | CO2 | 10,600 nm |
| Macsa | K1030 Plus | 30 Watt | CO2 | 10,600 nm |
| Macsa | K1060 Plus | 60 Watt | CO2 | 10,600 nm |
| Keyence | ML-G9300 | 30 Watt | CO2 | 10,600 nm |
| Control Laser Corporation | Concord CO2 PowerMark | 25 and 50 watt | CO2 | 10,600 nm |
| Control Laser Corporation | ProWriter FL20 | 20 Watts | Fiber | 1064 nm |
| Control Laser Corporation | ProWriter D25T | 25 Watt | YAG | 1064 nm |
| Control Laser Corporation | Prowriter D50 | 50 Watt | YAG | 1064 nm |

DataLase lasers are available from DataLase Inc. of Norcross, Ga. Domino lasers are available from Domino Printing Sciences of Cambridge, UK. Macsa lasers are available from Macsa Laser Solutions of Barcelona, Spain. Keyence lasers are available from Keyence Corporation of America of Woodcliffe Lake, N.J. Control Laser Corporation lasers are available from Control Laser Corporation USA of Orlando, Fla.

Exemplary Printing and Finishing Speeds

In commercial printing, the laser may be used to ablate at least a portion of a layer on a substrate moving along a printing line or finishing line at a predetermined speed that facilitates printing or finishing. According to various exemplary embodiments, printing speeds for web-offset, gravure type, digital presses, custom web printing (e.g., press and finishing or mailing on a single line) or other printing processes may include speeds more or less than about 8000 ft/min, more or less than about 4000 ft/min, more or less than about 3000 ft/min, more or less than about 1500 ft/min, more or less than about 1000 ft/min, more or less than about 500 ft/min, or more or less than about 250 ft/min. According to one various embodiments, printing speeds may include speeds greater than about 250 ft/min and less than about 8000 ft/min, greater than about 250 ft/min and less than about 4000 ft/min, greater than about 500 ft/min and less than about 4000 ft/min, greater than about 500 ft/min and less than about 3000 ft/min, greater than about 800 ft/min and less than about 3000 ft/min, greater than about 250 ft/min and less than about 1000 ft/min, greater than about 800 ft/min and less than about 3000 ft/min, greater than about 350 ft/min and less than about 500 ft/min, etc.

The laser may also be used to ablate at least a portion of the layer(s) from a substrate or other printed material on a finishing line. According to various exemplary embodiments, materials may move through a finishing line (e.g., on a conveyor) at finishing conveyor speeds (which carry the printed materials such as signatures or other printed publications to be ablated) at speeds of more or less than about 800 pieces/min, more or less than about 700 pieces/min, more or less than about 600 pieces/min, more or less than about 450 pieces/min, more or less than about 250 pieces/min, more or less than about 200 pieces/min, etc. According to various exemplary embodiments, finishing conveyor speeds may be more than about 200 pieces/min and less than about 800 pieces/min, more than about 250 pieces/min and less than about 800 pieces/min, more than about 450 pieces/min and less than about 800 pieces/min, and so on. According to various exemplary embodiments, finishing conveyor speeds may be more than about 230 ft/min, more than about 290 ft/min, more than about 525 ft/min, more than about 700 ft/min, more than about 815 ft/min, and more than about 930 ft/min. According to various exemplary embodiments, finishing conveyor speeds may be more than about 230 ft/min and less than about 930 ft/min, more than about 290 ft/min and less than about 930 ft/min, more than about 525 ft/min and less than about 930 ft/min, etc. In some instances, pieces/minute can be used to roughly calculate the speed of the conveyor at feet/minute equal to about (#pieces per minute*14)/12.

The distance from the laser to the substrate may vary depending on the type of laser used, including for example its wavelength and power. According to one exemplary embodiment, the distance of a laser from the print medium may be less than about 15 inches. According to another exemplary embodiment, the distance of a laser from the print medium may be between about 1 inch and about 15 inches, depending on the type of lens used. According to other exemplary embodiments, the distance of a laser from the print medium may be less than 1 mm, greater than about 0.1 mm, between about 0.1 mm and about 15 inches, or between about 1 mm and 15 inches, depending on the type of lens and laser used. In this regard, one may achieve greater marking speeds by placing the laser at a further distance from the substrate due to less distance the laser will have to move to print a character and because of the increased size of the print window. As the distance between the laser and the substrate decreases, less variance in print may occur due to vibration of the laser or movement of the substrate.

In one embodiment, the laser source is remote from the paper medium and fiber optic cables are used to communicate the light from the laser source to the paper. Such an embodiment allows the laser source to be placed in a less harsh environment and allows for improved cooling of the laser source. According to another exemplary embodiment, the data may be printed using other energy types, for example, an electron beam, gamma beams, x-ray beams, thermal IR, far IR or any other energy or light type generally capable of ablating a layer of material or substrate.

In one embodiment, the laser may achieve the desired marking speeds for commercial printing (either on the printing or finishing lines) by use of a system adapted to receive and output at least about 5 bytes or characters (e.g., about 40 bits) of data from a source of variable or fixed print data for printing every machine cycle. For purposes of this disclosure, a "machine cycle" may be the amount of time that it takes to print variable data on a single item of printed material via ablation as it moves along the line. According to other exemplary embodiments, the system may be adapted to output between about 5 and about 200 bytes or characters per cycle. According to various exemplary embodiments, the system may be configured to output more than or less than about 50 characters per printed publication, or more than or less than any of about 5, 10, 15, 50, 200, 500, or 1000 characters per printed publication. The laser may be configured for more than about 200 bytes or characters of data per cycle by using higher-speed data communication interfaces (e.g., Ethernet, Universal Serial Bus (USB), etc.), cache data source, less control data, use of multiple lasers, use of faster mirrors, such as micro-electro-mechanical systems (MEMS) for directing the laser beam, and other improvements in laser systems.

To calculate the number of characters printed per minute by the laser via ablation, one multiplies the number of characters output by the system by the printing press or finishing speeds (e.g., between about 200 and about 700 books/min). For example, if 5 characters are output by the system per cycle at a finish speed of about 200-700 books/min, according to various embodiments, printing speeds on the finishing line may include speeds between about 1000 char/min and about 3500 char/min. According to other exemplary embodiments where about 200 characters are printed per cycle at a finish speed of about 200-700 books/min, printing speeds on the finishing line may include speeds between about 40,000 char/min and about 140,000 char/min.

According to other exemplary embodiments where a laser with seven tubes and a printing capacity for two lines per tube is used, the system and laser may be adapted to print at about 820 ft/min. At twelve characters per inch and fourteen inch pin centers, the laser may print at about 288 characters per cycle.

Variable and/or fixed data may be printed with a resolution or pixel size of more or less than about 75 dots per inch (dpi), about 100 dpi, about 200 dpi, about 300 dpi, about 600 dpi, about 720 dpi, about 1000 dpi, about 1500 dpi, about 2000 dpi, about 2500 dpi, about 3000 dpi, or about 5000 dpi. The data may be printed with a resolution of greater than about 300 dpi and less than about 600 dpi (e.g., when used on a finishing line), greater than about 600 dpi and less than about 720 dpi (e.g., when used on a press or printing line), greater than about 300 dpi and less than about 720 dpi, greater than about 75 dpi and less than about 1000 dpi, etc. These resolutions may be used at speeds described above or at least about 1000 ft/min (e.g., in a press or printing line configuration), at least about 500 ft/min or between about 350 and about 500 ft/min (e.g., on a finishing line), etc. The variable and/or fixed data may be printed with or without the use of traditional dot printing or halftone dots, and may be printed as a bitmap or rasterized image, using vector graphics, using fulltone printing, or other types of printing. The data may be printed in any case with a resolution as fine as the energy submitted by the energy source, such as a laser, or as fine as may be printed based on a dimension of the energy source (e.g., width, diameter, etc.) and/or its effect on the layer being ablated. For example, a laser may be used to ablate ink at a width of less than a picometer, nanometer, micrometer, or millimeter. Moreover, multiple passes of the laser can create a large range of widths of printed features or pixels.

According to other exemplary embodiments, the laser may be used to ablate at least a portion of a layer on a product or on packaging moving along a packaging line at a predetermined speed. According to some exemplary embodiments, the packaging may travel past the laser at a rate of at least about one foot per second. According to other exemplary embodiments, the packaging may travel past the laser at a rate of less than about ten feet per second.

Communication

According to various exemplary embodiments, the system may communicate with the laser and/or printing or finishing line via a wired or wireless connection. According to other exemplary embodiments, this communication may by facilitated over Ethernet, LAN, USB, Firewire, RD-232, or RS-485 connections or another type of serial, parallel, or optical communication protocol, such as a proprietary communication protocol. According to other exemplary embodiments, the communication may by facilitated over a WAN, WiFi, WiMax, Bluetooth, RF, cellular, or another wireless communication protocol. These communication protocols can be used between a source of variable or fixed data and the laser (e.g., at a wired or wireless interface), or between other components of the system.

Location of Ablating Apparatus

The ablating apparatus, such as a laser, can be placed anywhere along a printing line or finishing line. Variable and/or fixed data may be printed to materials, such as, for example, a paper web or paper sheet, that already includes fixed data printed thereon or to materials prior to printing fixed data thereon. Examples of where the laser may be placed in a commercial printing operation include at the beginning, end or at any point along any of (1) a printing line (e.g., before or after application of at least one layer, before or after application of four layers of CYMK colors, etc.); (2) a binding line, including a saddle stitching or perfect binding line (a) either pre- or post binding or (b) pre- or post-delivery to the gathering chain or conveyor or (c) pre- or post-delivery to the pocket; (3) a pre- or post-trimming operation; (4) a pre- or post-wrapping operation; (5) a mailing table; or (6) a mailing or delivery line. In another embodiment, the print media may be printed with fixed or variable data after blending of materials for combined mailing, which may be printed on a wrapper, through a wrapper onto the printed material within the wrapper, on a label affixed to the wrapper, etc. In one embodiment, the underside or inside of the pages of the printing medium may be printed with fixed or variable data during a finishing process (e.g., binding, stitching, wrapping processes, etc.). According to an exemplary embodiment, fixed or variable data may be printed on the outside or exposed sheets of a printing medium.

Examples of where the laser may be placed in a packaging operation include at the beginning, end or at any point before or after a packaging feeder (e.g., primary packaging, secondary packaging, tertiary packaging, etc.), a product feeder, or any other point on a packaging line.

According to one embodiment, printing fixed or variable data by ablating at least a portion of a layer with a laser may be done in lieu of conventional ink jet or laser jet or in combination with such equipment.

According to another exemplary embodiment, data may be printed by an ablating apparatus as described herein on a flat card (e.g., inserts, tear-outs, etc.) prior to, during, or after binding, stitching, blowing, or onsetting to a book, magazine, or other printed material. According to still another exemplary embodiment, data may be applied on a cover for a printed material before, during, or after a stitching or binding process.

According to still another exemplary embodiment, a line may be configured to print both fixed and variable data. For example, the printing line may print fixed information (e.g., company name, product description or picture, etc.) on a substrate as well as variable data (e.g., customer name, customer address, amount, etc.) using the techniques of the present application. According to yet another exemplary embodiment, variable data may be printed using the apparatus described herein that applies the print based on pre-printed codes on the printing medium.

According to yet another exemplary embodiment, the ablating apparatus may print variable data as bar codes.

According to another exemplary embodiment, variable data may be printed as direct mailing/custom web or sorting information.

It is noted that if the wrong address is printed during finishing or if there is an ink splot or error on the printing plate of the web off set printing, a laser can be used to ablate out or correct the error. For web printing errors, this could save having to recreate a plate if the plate was created incorrectly or poorly.

EXAMPLE

A sealed-off $CO_2$ laser (rated at about 30 Watts, 10.6 μm) was used to ablate variable data in the form of individual names to personalize printed publications. The laser ablated ink on each of the publications to print a different name (the variable data) over an image of an article of clothing printed (the fixed data) on each publication. The fixed data was printed with a web offset printing press. In one example, a name was printed on about 500,000 pieces. In another example, a name was printed on about 3 million pieces. In a third example, a name was printed on about 500,000 pieces in a curved or arced orientation. In each example, an advertisement within the printed publications was personalized in an effort to enable the recipients of the advertisements to see what the clothing would look like if ordered with their names.

In the three examples, the publications were printed with the fixed data and sent to a saddle stitcher or other finishing line. At the saddle stitcher line, the ablation apparatus was positioned over a mail table. To be efficiently placed in the proper position, the ablation apparatus was mounted to a portable stand adapted to be set on the floor rather than the stitching machinery itself to reduce vibration and provide greater portability.

The laser was generally set with a marking intensity of about 80%, and more generally at a marking intensity of between about 70-90%. The laser was adapted to receive up to at least 80 bits of continuous variable data per bound piece. Accordingly, the laser apparatus was able to convert the received data up to at least 10 font characters, and ablate traditional off-set ink from a paper substrate to form variable print at a rate of approximately 250-450 pieces per minute with the average piece having about six characters printed thereon by the laser. The laser used an SHC 60 lens, and was positioned at approximately 190.5 mm (7.5 in.) from the printed publication. To obtain the desired font, the laser scribed each character twice on each of the printed publications as the printed publications passed by the ablation apparatus to ablate the desired amount of ink and reveal the variable data.

Figure 15:
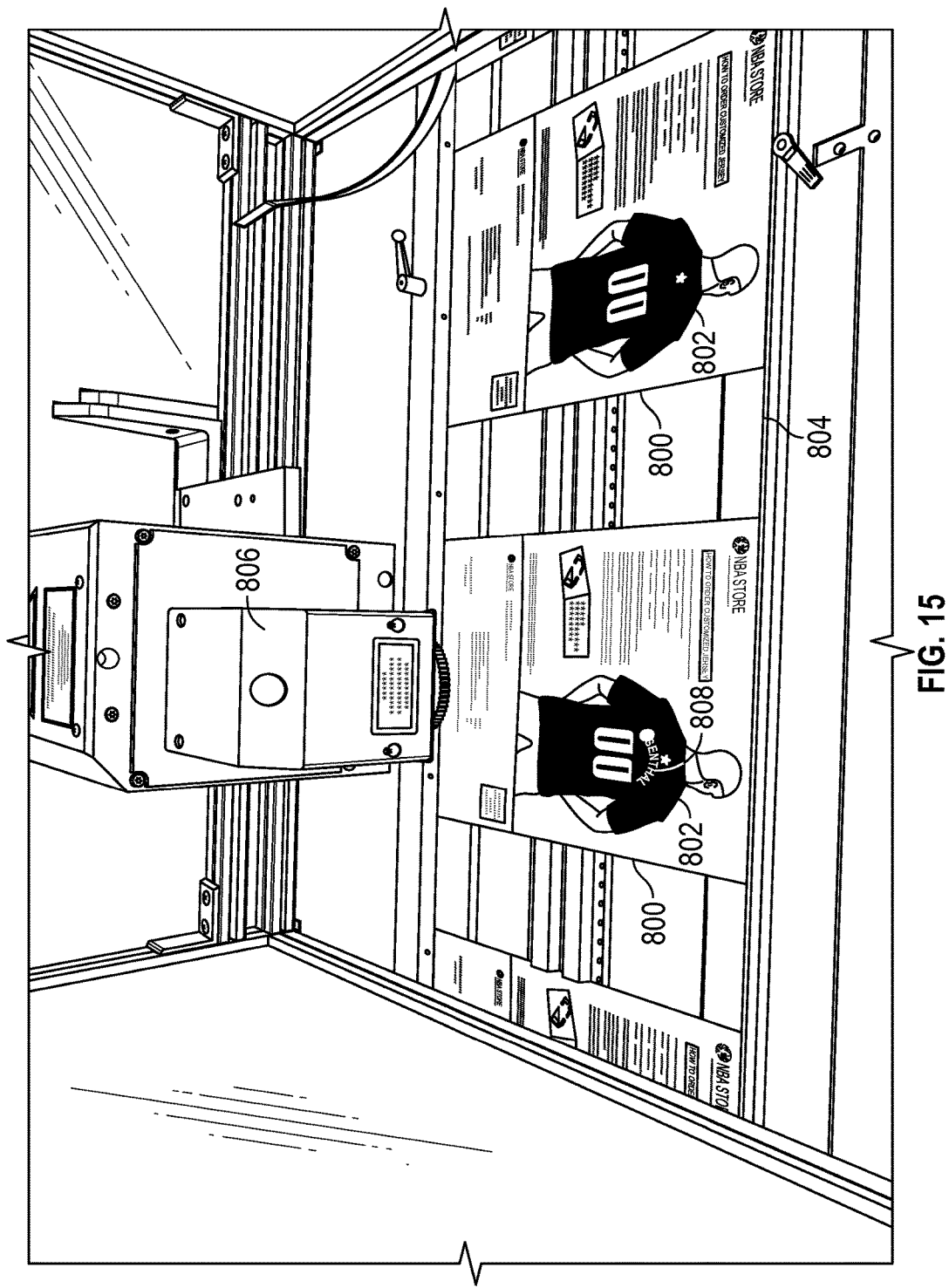
FIG. 15 is a photograph of a laser performing ablation in a finishing line according to an exemplary embodiment.
Figure 16:
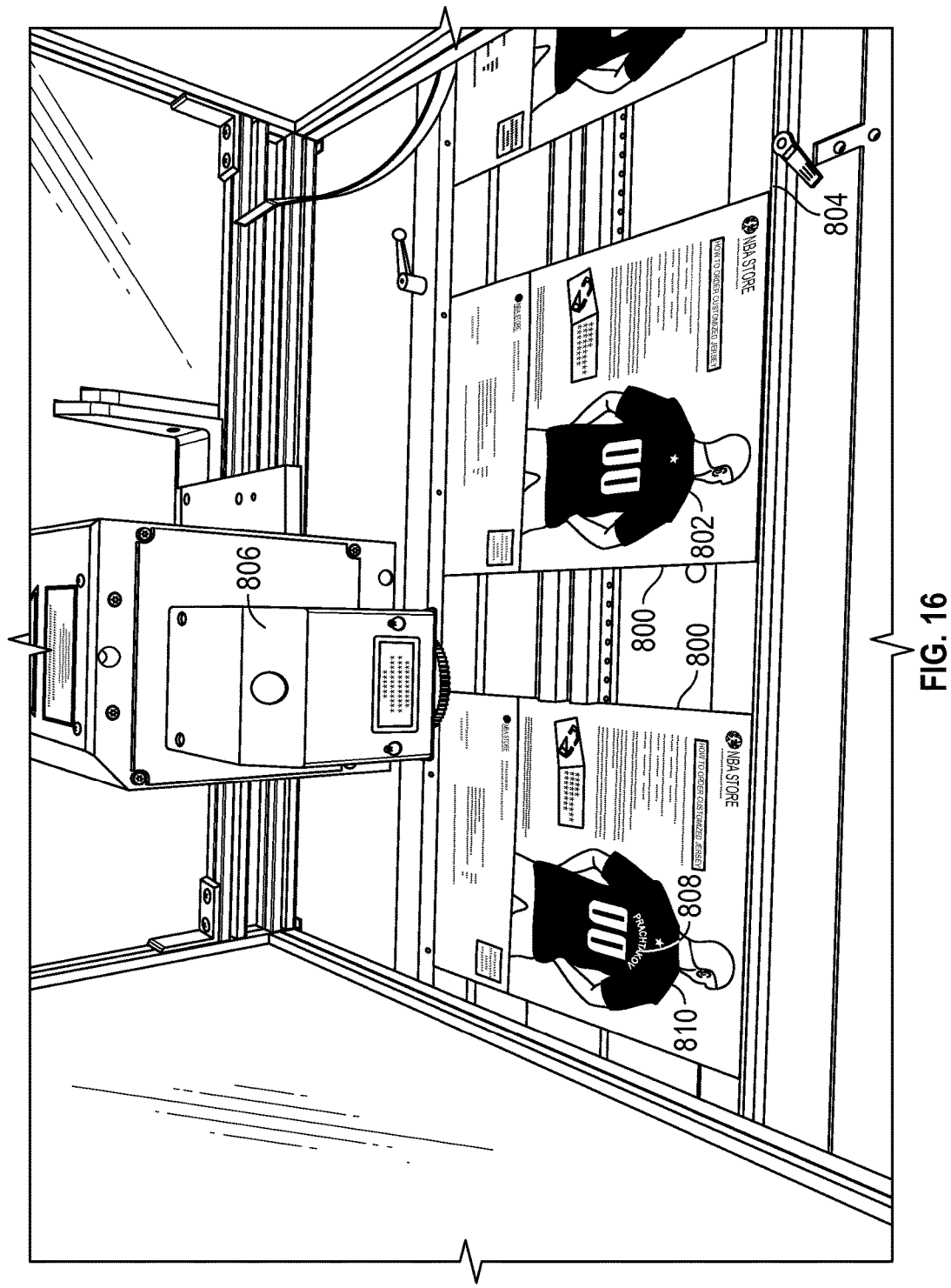
FIG. 16 is a photograph of an ablation printer in a finishing line according to an exemplary embodiment.

Referring to FIGS. 15-16, a printed material is shown during ablation and after ablation during the third example described above. Prior to ablation, the unablated publication 800 (i.e., the back of a magazine) included a fixed data graphical image 802 of a sports jersey without a name printed on it. As the printed material moved on a conveyor 804 (from right to left) it passed under an ablation laser 806. As illustrated in FIG. 15, as graphical image 802 of the jersey passed under ablation laser 806, the laser began to remove a dark blue colored surface layer of the magazine to reveal a personalized name 808 (i.e., variable data) on the jersey in a substantially white color. Laser 806 moved in an arced path to ablate the name in a substantially arced shape. As illustrated in FIG. 16, the ablated magazine 810 included a graphical image 802 of a jersey with a personalized name 808 printed on it via removal of the top layer to reveal a different colored layer underneath. The ablated magazine 810 continued to move down the line to a finishing task (e.g., wrapping, bundling, mailing, additional ablating, etc.) while a new unablated magazine 800 passed under the ablation laser for personalization.

A laser printer or other energy source may be located at least about 1 inch from the substrate which is to be printed upon, at least about 3 inches, at least about 6 inches, or at least about 12 inches.

Illustrated Embodiments

Printing Press

Referring to FIG. 1, an example of a printing line 10 for printing a multi-color image upon a web 12 is illustrated. In the illustrated embodiment, four printing units 14, 16, 18, and 20 each print one color of the image upon the web 12. Each print unit 14, 16, 18, 20 includes an upper blanket cylinder 22, an upper printing plate cylinder 24, a lower blanket cylinder 26, and a lower printing plate cylinder 28. In the printing line 10, colors 1, 2, 3, and 4 on units 14, 16, 18, and 20 are typically black (K), cyan (C), magenta (M), and yellow (Y), respectively. However, it is noted that any colors of ink may be used for web-offset printing, and more or less than four print units may be used. The location of the printing units 14, 16, 18, and 20 relative to each other (e.g., the color ordering) may vary depending on user preference and/or the color scheme. In the illustrated embodiment, the printing press is a web offset press, however in other exemplary embodiments gravure, flexographic, digital presses, or other types of printing system may be used. Printing line 10 may also include an ablation apparatus 30 that is configured to ablate at least a portion of a layer printed on web 12. Printing line 10 may also include one or more driers to dry the layer(s). An ablation apparatus can be placed before or after the driers to ablate either a solid or liquid layer. According to another exemplary embodiment, an ablation apparatus can be put before or after any of printing units 14, 16, 18, and/or 20.

Depending on the layer or the substrate beneath the ablated layer, the print may be in color, metallic or in monochrome (e.g., black). In one particular embodiment, the variable and/or fixed data may be printed in a substantially white color by ablating non-white ink to reveal portions of a substantially white paper substrate. In another embodiment, ink may be ablated to reveal a metallic ink or other metal-containing substrate. In still other exemplary embodiments, the layer may be ablated to reveal a matte finish, a glossy finish, a texture, or a scent.

According to one exemplary embodiment, a variable data printing (VDP) operation may include a distribution location. According to another exemplary embodiment, a VDP operation may include a delivery address. According to one exemplary embodiment, a VDP operation may include pricing information. According to other exemplary embodiments, a VDP operation may include advertisements (e.g., tailored to an individual reader or recipient or a group of readers or recipients), coupons, geographic location-based information, or any other variable information.

According to one exemplary embodiment, a VDP operation may be applied directly to the surface of a printed publication. According to another exemplary embodiment, a VDP operation may apply variable data to an advertisement, for example the name on the back of an image of a jersey, or image of other clothing or clothing materials. According to other exemplary embodiments, a VDP operation may apply variable data to any item that may include variable information. According to another exemplary embodiment, a VDP operation may be applied to a label that may be affixed to a surface.

Versioning

According to another embodiment, the system may be configured to print a plurality of versions of a printed publication. The versions may be for different geographic regions. For example, the versions may include a "metro" area version and a "suburb" area version, versions printed with different advertiser data to reflect local retailers, versions printed with different theater data to reflect local movies playing, etc. Alternatively, versions may represent any variable parameter that can be organized by variable data, such as, geographic, demographic, postal, personal, and/or book data.

According to one exemplary embodiment, versions can represent different book titles, magazine titles or magazine publishers, for example, in the case where the ablation system is disposed on a printing line and/or other finishing line configured to produce two or more different titles at the same time.

The ablation techniques described herein may be used to print fixed data onto a web (or sheet) or variable data with only intermittent variation. For example, the laser may ablate the printed publications based on a first set of version data to substantially complete a first print run and then switch to ablating the printed publications based on a second set of version data to substantially complete a second print run. The techniques described herein can permit each print run to commence without having to stop the press run. In another example, the version data may be varied within a print run but not with each piece of printed material. This could be particularly useful when printing different versions of publications, which have runs of repeatable variable data together with fixed data. Using the ablative techniques described herein, the differences between versions can be printed by ablating at least a portion of the layers with a laser. This will reduce and may potentially eliminate the need for manufacturing different plates or engraving different cylinders that will be used to print each version of a publication, the make-ready time to change over the plates during a production run, and the labor, paper and energy waste associated with such make-ready and plate production. In such embodiments, the ablating apparatus can be located on either the printing line or a finishing line.

Saddle Stitching Line

Figure 2:
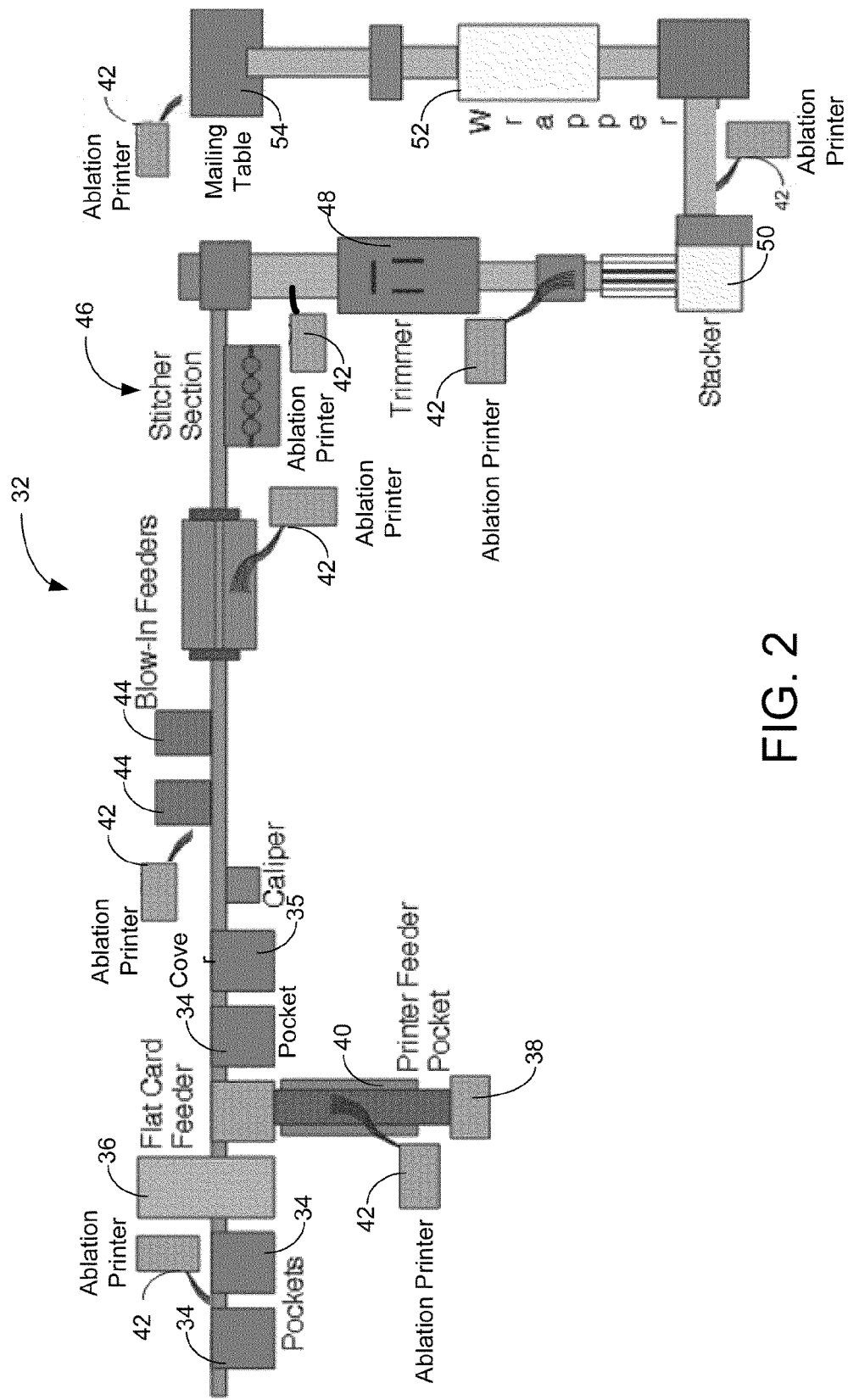
FIG. 2 is an overhead schematic view of a finishing line with a stitcher according to an exemplary embodiment.

Referring to FIG. 2, an exemplary finishing line 32 is generally configured to assemble signatures, books, blown cards, pamphlets, inserts, onserts, etc. into a finished printed material or publication and bind them with saddle stitching. Finishing line 32 may include at least one pocket 34, a flat card feeder 36, a printer feeder pocket 38, a printer feeder 40, at least one ablation printer 42, at least one blow-in feeder 44, a stitcher section 46, a trimmer 48, a stacker 50, a wrapper 52, and a mailing table 54. Any of the above listed elements can be removed from finishing line 32 without departing from the scope of the disclosure. Finishing line 32 is preferably a post printing line or finishing line modified to include at least one ablation printer 42 (as described above). Line 32 can be utilized to bind, fold, batch, collate, gather, mail and/or distribute product. The elements of line 32 may be rearranged in any of a variety of configurations.

Pockets 34 can be associated with fixed and/or variable data printing via laser ablation or can receive pre-printed sheets or pages that may be referred to as signatures or forms. Each signature is folded over a moving wire, chain, or bar (i.e., a saddle) and thus the printed material travels from pocket to pocket in finishing line 32 as it is assembled. At each pocket 34, a page can be combined with other sheets (i.e., signatures) to form a pamphlet or book. The last pocket is typically a cover pocket 35 where the cover is placed over the other signatures of the printed material. Alternatively, line 32 can be configured to provide a single page product or a folder type product.

A flat card feeder 36 may insert a flat card into a pocket 12 for inclusion with the print medium. Flat card feeder 14 may include printed materials with fixed and/or variable data, for example printed by laser ablation.

Printer feeder pocket 38 is generally configured to feed a signature to a pocket 34 via pocket feeder 40 (e.g., a conveyor). An ablation printer 42 (as described above) may be coupled to pocket feeder 40 to ablate a layer (e.g., ink, varnish, etc.) off of the signature substrate (e.g., paper) to print fixed and/or variable data (e.g., a graphical image, text, etc.) either on the top or outside face of the signature or on the under or interior side of the saddled signature.

It is noted that although FIG. 2 may illustrate ablation printer 42 to be in specific positions, in other exemplary embodiments the ablation printer 42 may be at any position in a printing or finishing line 32 where variable data may be applied to a printed material. For example, ablation printer 42 may be placed before trimmer 48 in the finishing area (e.g., an area to staple, bind, cover, label, etc.) according to one exemplary embodiment. In other exemplary embodiments, ablation printer 42 may be mounted on trimmer 48, in printer feeder pocket 38, at a blow in feeder 44, on a trimmed medium, at a flat card feeder 36, near a stacker 50, near a wrapper 52, etc. In another exemplary embodiment, ablation printer 42 may be remote from a printing or finishing line 32. In still another exemplary embodiment, ablation printer 42 may be portable and placed anywhere in a printing or finishing line 32 or external to a printing or finishing line 32. Ablation printer 42 may be placed within a binder to print on the inside of a signature as it passes through line 32.

Blown card feeder 44 and an ablation printer 42 may be configured to print data (e.g., an advertisement) on a card that is forcefully blown (i.e., by air or another gas) into a stack of signatures. Ablation printer 42 may be configured to print variable data (e.g., customized advertisements, address information, etc.) to the card. Once variable data has been printed, the card may be blown into the printed material. It is noted that while blown card feeder 44 and an ablation printer 42 are illustrated as being before stitcher section 46 in printing line 32, in other embodiments, blown card feeder 44 and ablation printer 42 may be placed at other points in printing line 32, for example after stitcher 46 or in a finishing line after trimmer 48, or may be omitted.

Stitcher section 46 is typically configured to stitch the assembled and collated printed materials received at each pocket 34 and cover pocket 35. According to various exemplary embodiments, stitcher section 46 may join the printed medium using a fastener (e.g., stitches, wire staples, etc.) or any other suitable technique.

Trimmer 48 is configured to trim to book to its desired trim size (e.g., 8½"×11") and remove any excess material as received from stitcher 46. Trimmer 48 may include one or more cutting apparatuses or be of any other design suitable for removal of excess material from the printed material.

Stacker 28 is configured to stack or gather printed materials from trimmer 48 in preparation for bundling or wrapping. Wrapper 52 then wraps or bundles the stacked printed materials for mailing or delivery. It is noted that a strapper may be present after stacker 50 and/or after wrapper 52 to strap stacks of printed material together, for example with a nylon strap or cord.

Binding Line

Figure 3:
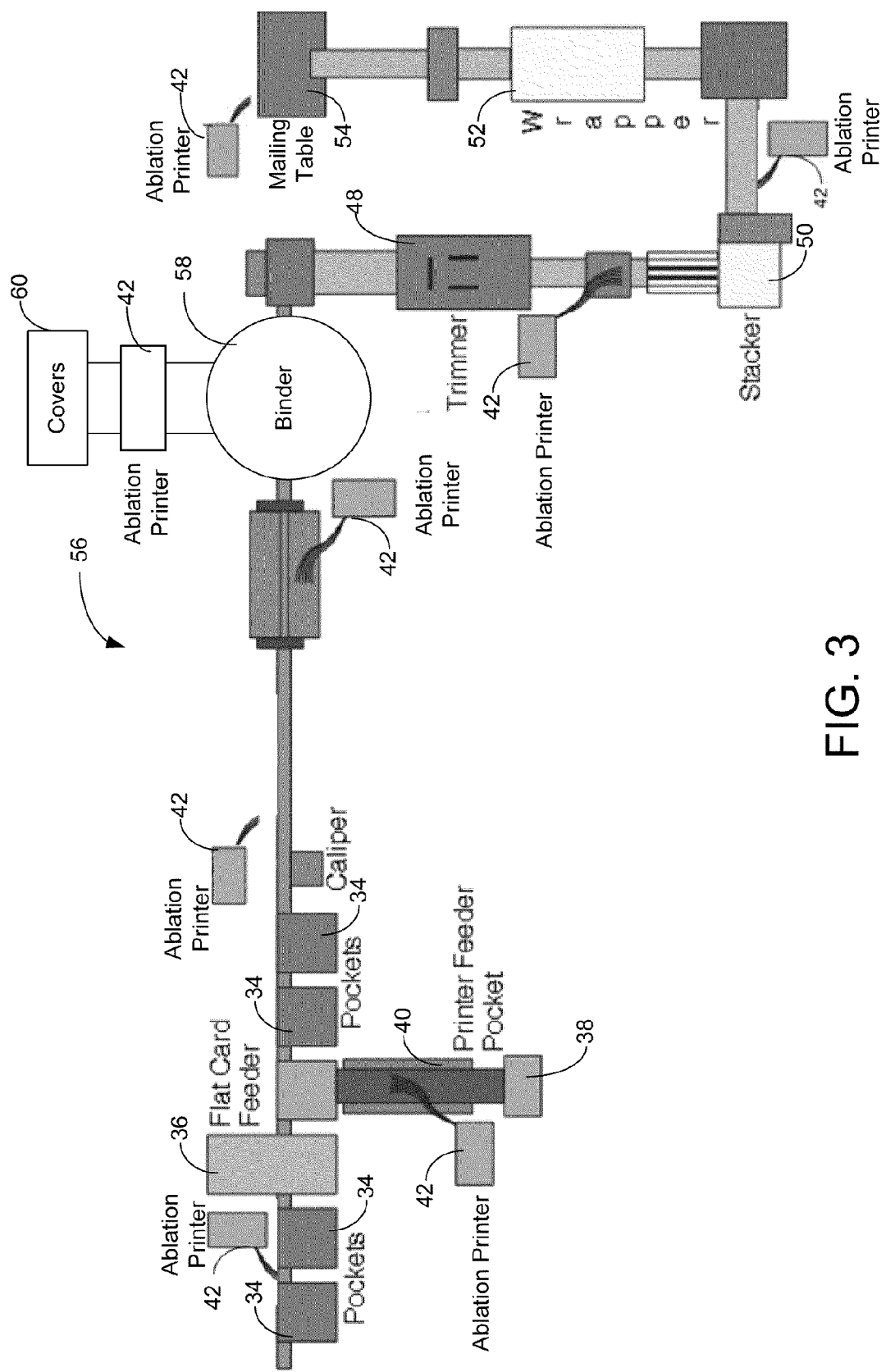
FIG. 3 is an overhead schematic view of a finishing line with a binder according to an exemplary embodiment.

Referring to FIG. 3, an exemplary finishing line 56 is generally configured to assemble signatures, books, pamphlets, inserts, onserts, etc. into a finished printed material or publication and bind them with a "perfect binding" technique that binds the signatures together with adhesive. Finishing line 56 of FIG. 3 is similar to finishing line 32 of FIG. 2 except for the manner of travel down the line and that line 56 uses a binder 58 instead of stitcher section 46 to attach the pages and cover together. The elements of line 56 may be rearranged in any of a variety of configurations.

The signatures are fed into pockets 34 by printer feeder pocket 38 via printer feeder 40 as before, however each signature is stacked on top of one another substantially flat on a conveyor line, chain, or gatherer instead of being saddled. The last pocket 34 does not receive the cover as it does in line 32. A set of covers 60 are separately fed into binder 58 for binding to the signatures. The conveyor leading to binder 58 rotates and thus rotates the signatures into a generally vertical axis where they are clamped by binder 58. The clamped signatures are rotated around a carousel and the end to be bound is dipped in an adhesive such as glue. At this point, the cover is pressed against the adhesive covered end to bind the printed material, which then travels along an extended drying line to allow the adhesive to dry. The printed material is then sent to trimmer 48 and the process continues as in finishing line 32.

It is noted that according to various exemplary embodiments, ablation printers 42 may be present in one or more of the same locations in finishing line 56 as in finishing line 32 including before or after binder 58 rather than before or after stitcher section 46. Additionally, an ablation laser 42 may be located on the conveyor that leads covers 60 to binder 58 for ablation of fixed and/or variable data into the outside of the cover, for example with a book title or a personalized message.

Polywrap Line

Figure 17:
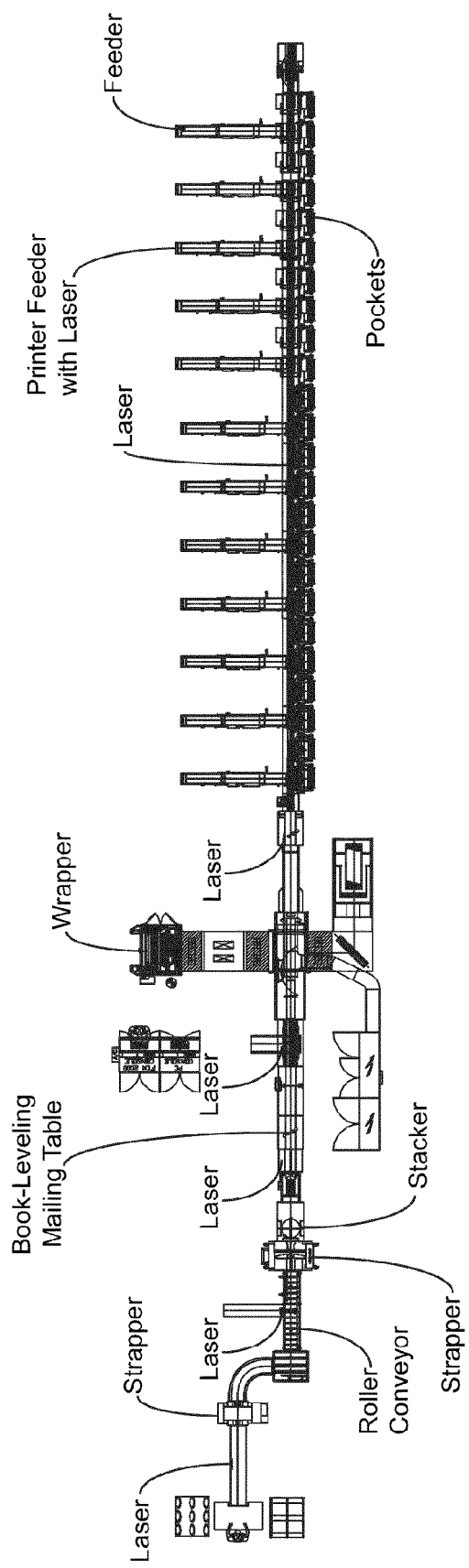
FIG. 17 is an overhead schematic view of a finishing line according to another exemplary embodiment.

Referring to FIG. 17, an exemplary finishing line is generally configured to assemble signatures, books, pamphlets, inserts, onserts, etc. into a finished printed material or publication and wrap, stack and strap them similar to the lines of FIGS. 2 and 3. The finishing line is similar to the finishing lines of FIGS. 2 and 3 except that the stitcher or binder are omitted and the wrapper wraps the unbound or unstitched finished printed material. The wrapper is configured to wrap the signatures with a poly wrap (e.g., plastic) and/or a paper wrapping. The elements of the finishing line may be rearranged in any of a variety of configurations not illustrated in the figure. For example, the laser ablation printers illustrated in the figure may exist in other or additional locations on the line, for example between each pocket, as described above.

Mailing Line

Figure 4:
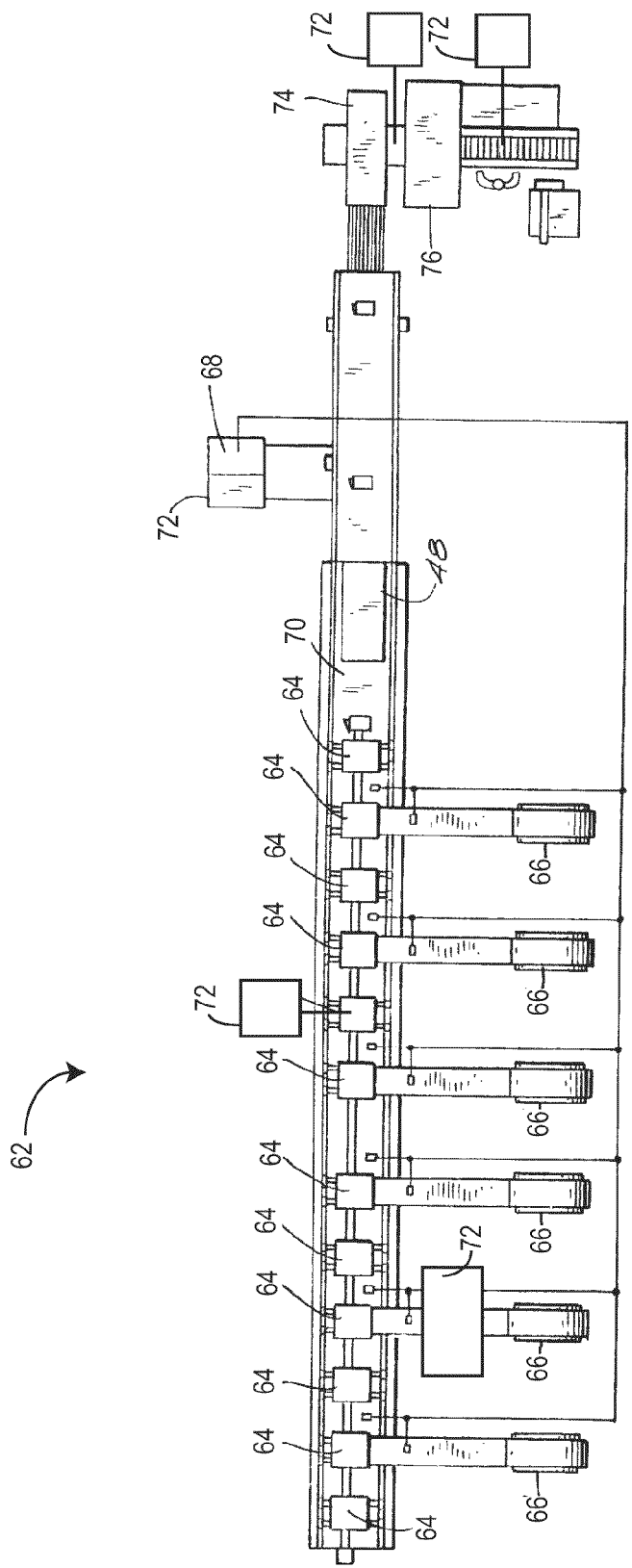
FIG. 4 is an overhead schematic view of a mailing line according to an exemplary embodiment.

Referring to FIG. 4, a mailing or co-mailing line 62 that may receive the finished printed materials from the finishing lines of FIG. 2 or 3 is illustrated. Mailing line 62 is configured to combine the finished printed materials (e.g., pre-personalized books with variable data, books with only fixed data, etc.) described above and illustrated in FIGS. 2 and 3, with other finished materials, for example to generate bundles of materials with like zip codes, carrier routes, recipient or destination addresses, or other postal information. Mailing line 62 includes one or more pockets 64. Some of the pockets 64 may be coupled to stacks or bundles of similar finished materials (e.g., all of one book title) in a pocket feeder 66. The finished materials may be bundled in postal code order. The elements of line 62 may be rearranged in any of a variety of configurations.

The mailing lists associated with the different publications in pocket feeders 66 may be merged to create a master mailing list that includes the desired postal code mailing sequence of the finished materials. The master mailing list may be maintained in a controller 68. Pocket feeders 66 are selectively actuated by controller 68 based on the master mailing list. Pocket feeders 66 selectively feed books onto a conveyor 70 in the desired postal code order.

An ablation printer 72 downstream of pockets 64 also operates under the control of controller. Ablation printer 72 may print fixed or variable data (e.g., addresses, postal code, destination, another identifier, a personalized message, an advertisement, etc.) on the finished materials. The finished materials are then directed to a stacker 74 and a wrapper 76 that bundle the materials together for mailing according to the postal codes. It is noted that a strapper may be present after stacker 74 and/or after wrapper 76 to strap stacks of printed material together, for example with a nylon strap or cord.

An ablation printer 72 may print fixed and/or variable data to the stacked materials after stacker 74, for example to mark each book on the stack with the destination. An ablation printer 72 may print fixed and/or variable data to the wrapped materials after wrapper 76, for example to mark each wrapped bundle of books with a single postal code or destination.

Using the methods and designs disclosed herein, variable data can be printed to a medium in lines 32, 56, or 62 before and during an offline or online finishing process. In one example, fixed data can be printed to a medium, for example an article in a magazine or product information on a blown card. Variable data can then be printed on the medium, for example by a laser ablation technique. The variable data may include addresses, pictures, coupons, any other type of variable data, or any combination thereof. Variable data may be printed on the print medium during the offline or online finishing process.

Packaging Line

Figure 18:
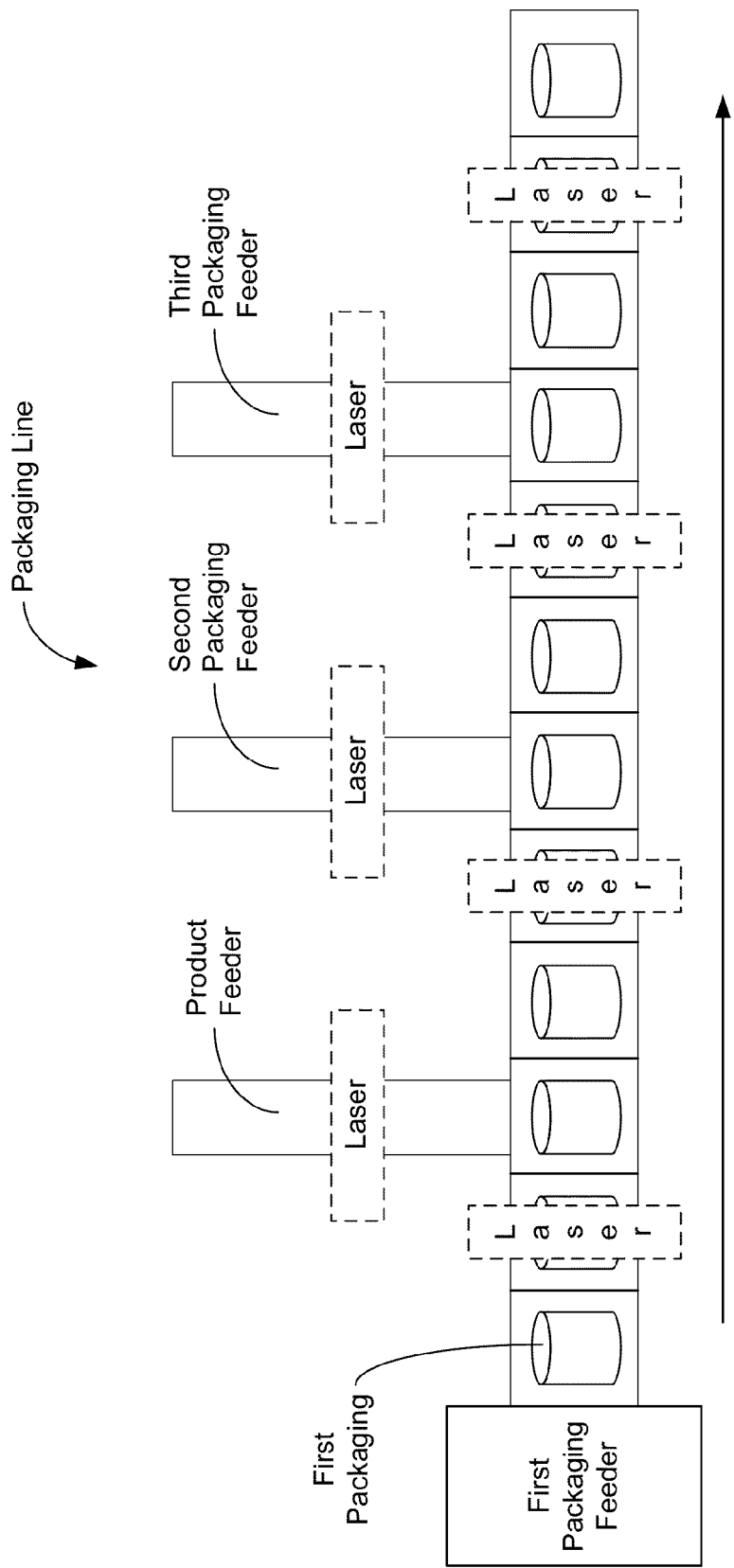
FIG. 18 is an overhead schematic view of a packaging line according to an exemplary embodiment.

Referring to FIG. 18, a packaging line is illustrated that may be configured to package a product. The packaging line is configured to package or place packaging on or around a product, for example to display, ship, or preserve the product. The packaging line may include one or more pockets. Some of the pockets may be coupled to stacks or bundles of discrete packaging units (e.g., primary, secondary, and/or tertiary packaging units) in a packaging pocket feeder. One or more of the pockets may be coupled to a product pocket feeder for inserting a product into a packaging unit. Alternatively, the product feeder may insert a product into a pocket of a conveyor with the packaging units placed on or around the product. The elements of the packaging line may be rearranged in any of a variety of configurations.

The packaging and products associated with the pocket feeders may be compiled in a list that includes the desired sequence of the packaged products. The list may be maintained in a controller (e.g., control circuit 503). The pocket feeders may be selectively actuated by the controller based on the list. The pocket feeders selectively feed packaging units and products onto the conveyor in the desired order. The pocket feeders may also fasten the packaging units to the product or insert the product into the packaging unit.

A laser ablative apparatus may be mounted over any one of the pockets or pockets feeders and also operates under the control of controller (e.g., control circuit 503). The laser may print fixed or variable data on the packaging units and/or products before, after, and/or during coupling of the packaging units to the product or to other packaging units. The power to the energy source or laser may be reduced or removed between printing on the discrete packaging units.

Using the methods and designs disclosed herein, variable data can be printed to paper packaging in lines 32, 56, or 62 before and during an offline or online finishing process. The variable data may include product information, shipping information, pictures, coupons, any other type of variable data, or any combination thereof.

Variable Data Signature/Book Locations

Figure 5:
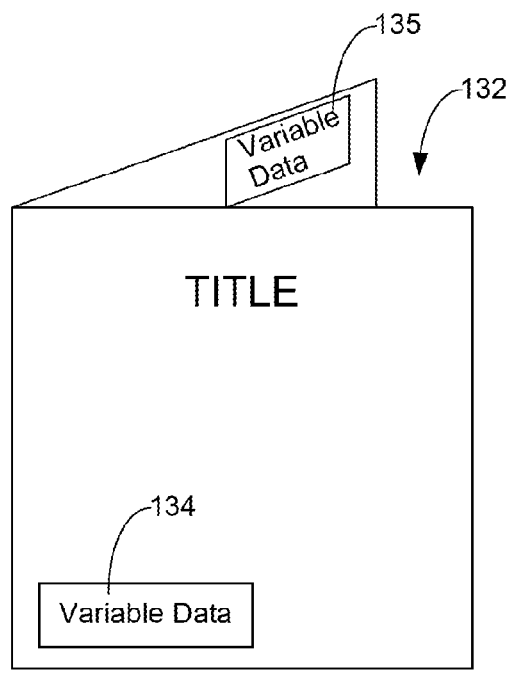
FIG. 5 is a perspective view of a printed material including variable data applied according to one exemplary embodiment.
Figure 6:
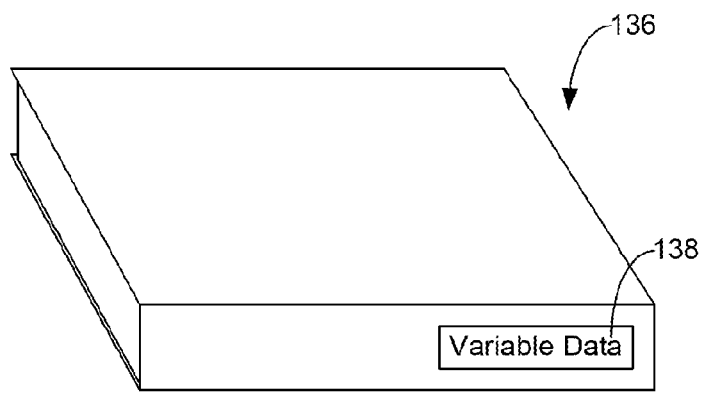
FIG. 6 is a perspective view of a printed material that includes variable data applied to the printed material according to one exemplary embodiment.
Figure 7:
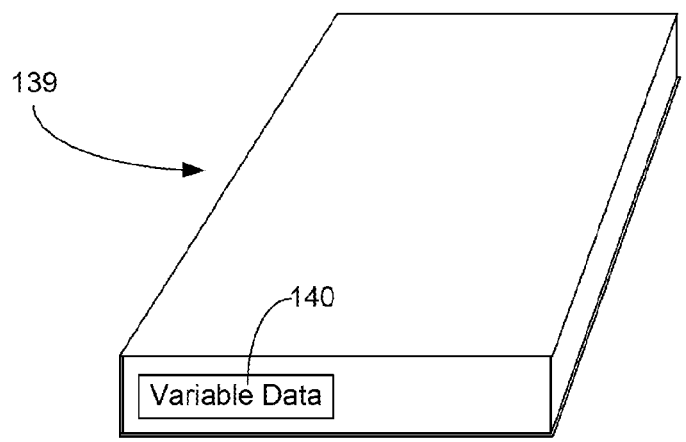
FIG. 7 is a perspective view of a printed material that includes variable data applied on the edges of the printed material pages according to one exemplary embodiment.

Referring to FIGS. 5-7, printed materials include variable data according to multiple exemplary embodiments. Referring specifically to FIG. 5, an example printed material 132 includes variable data 134 on the cover. As described above, according to various exemplary embodiments, variable data 134 may include an address, pricing information, an advertisement, etc. Additionally, printed material 132 may include variable data 135 on the underside of a page or signature of the printed material, for example if printed on a saddle-stitching finishing line. Referring specifically to FIG. 6, a printed material 136 includes variable data 138 on the spine, for example a data signifying a point of sale for a magazine. Referring specifically to FIG. 7, a printed material 139 includes variable data 140 on the edges of the pages of the printed medium, for example signifying an appropriate cover. Note that variable data 134, 138, and 140 may be of different sizes and shapes to accommodate the printed data, according to other exemplary embodiments.

Laser Configurations

Referring to FIGS. 8 and 9, laser ablation apparatus 320 has a laser matrix or array configuration 344 to print variable data on a printed medium as the medium passes beneath or near the laser matrix. This configuration may allow for more variable data to be printed at a faster speed, for example using a rasterized, dot-matrix, or bitmap-style printing method. Alternatively, configuration 344 can be made of laser diodes. It is noted that while FIG. 6 shows that matrix 344 includes sixteen lasers, more or fewer than sixteen lasers may be used according to other exemplary embodiments.

Referring to FIG. 10, a laser ablation apparatus 420 includes a matrix laser configuration 444 with more than one row of lasers. Laser ablation apparatus 420 may operate similar to laser ablation apparatus 320 with a greater printing capacity. According to various exemplary embodiments, the rows of matrix 444 may be lined up with an adjacent row or each row may be staggered. In one embodiment, matrix 444 is made up of lasers on a single head.

Referring to FIG. 11, an exemplary system 500 is configured to add variable data to a printed material or publication. System 500 may include ablation printer 502, a data source 504, an input/output (I/O) stream 506, and a printed material 510.

Ablation printer 502 is configured to receive print data from data source 504 for output onto printed material 508 via ablation. Printer 502 includes a control circuit 503 and a one or more lasers 516. Control circuit 503 includes a data source 510, a processing circuit 512, and an interface 514. According to various exemplary embodiments, data source 510 may be a memory, a local cache, a local hard disk drive, a CD-ROM, a floppy disk, a random access data source (e.g., a RAM), a read-only data source (e.g., a ROM), an Ethernet port, a communication port, or any other volatile or non-volatile memory capable of locally storing fixed, variable, and/or version data and transferring that data to and from processing circuit 512.

Processing circuit 512 is configured to process a fixed, variable, or version data input stream from data source 504 and/or data source 510 and output commands to laser 516 that will cause the laser to ablate the print data on printed material 508. Processing circuit 512 may also receive commands from a user via interface 514 to aid in the processing of the data input stream. Alternatively, processing circuit 512 may prompt a user via interface 514 for instructions. According to various exemplary embodiments, processing circuit 512 may be any processing circuit of past, present, or future design that is capable of processing print data into commands usable by a laser for ablation. Processing circuit 512 may comprise analog and/or digital components, such as a microprocessor, microcontroller, application-specific integrated circuit (ASIC), field-programmable gate array (FPGA), or other electronic, mechanical, or electro-mechanical components, as well as any computer-readable code or software operable therewith or thereon, configured to perform the functions described herein and other known functions.

Interface 514 is configured to provide a menu structure, algorithm, or other I/O interface that I/O stream 506 (e.g., a user, an external computer, etc.) may interact with to provide instructions or data to processing circuit 512 from the I/O stream 506 or to provide instructions or data to the I/O stream related to information about the processing circuit 512 or laser 516. Interface 514 may be any interface capable of communicating print data information between a processing circuit and an external I/O stream.

Laser 516 is configured to remove at least one layer of printed material 508 by outputting an ablation beam. As described above, laser 516 may be one or more of a $CO_2$ laser, a fiber laser, a laser diode, a diode array, a YAG laser, or any other laser capable of removing a layer from a printed material via ablation.

Data source 504 is configured to store variable, fixed, and or version data and to send the print data in a data input stream to ablation printer 502. According to various exemplary embodiments, data source 504 may be a memory, a hard disk drive, a CD-ROM, a floppy disk, a remote server, a random access data source (e.g., a RAM), a read-only data source (e.g., a ROM), cache, flash, Ethernet port, communication port, or any other volatile or non-volatile data source capable of storing print data. Data source 504 is configured to communicate with printer 502 using any of the communication techniques described hereinabove.

According to a number of exemplary embodiments, printed material 508 may be any substrate (e.g., paper) upon which one or more layers of print, ink, varnish, gloss, a scent, matte finish, metallic finish, and/or other layer exist.

According to some exemplary embodiments, the system may be a USB Scanner Controller with a Flash Extension available from SCAPS GmbH of Deisenhofen, Germany, the Videojet Supply Unit from Videojet Technologies of Wood Dale, Ill., or a custom print data processing or interface system.

Multi-Layer Ablation

Figure 12:
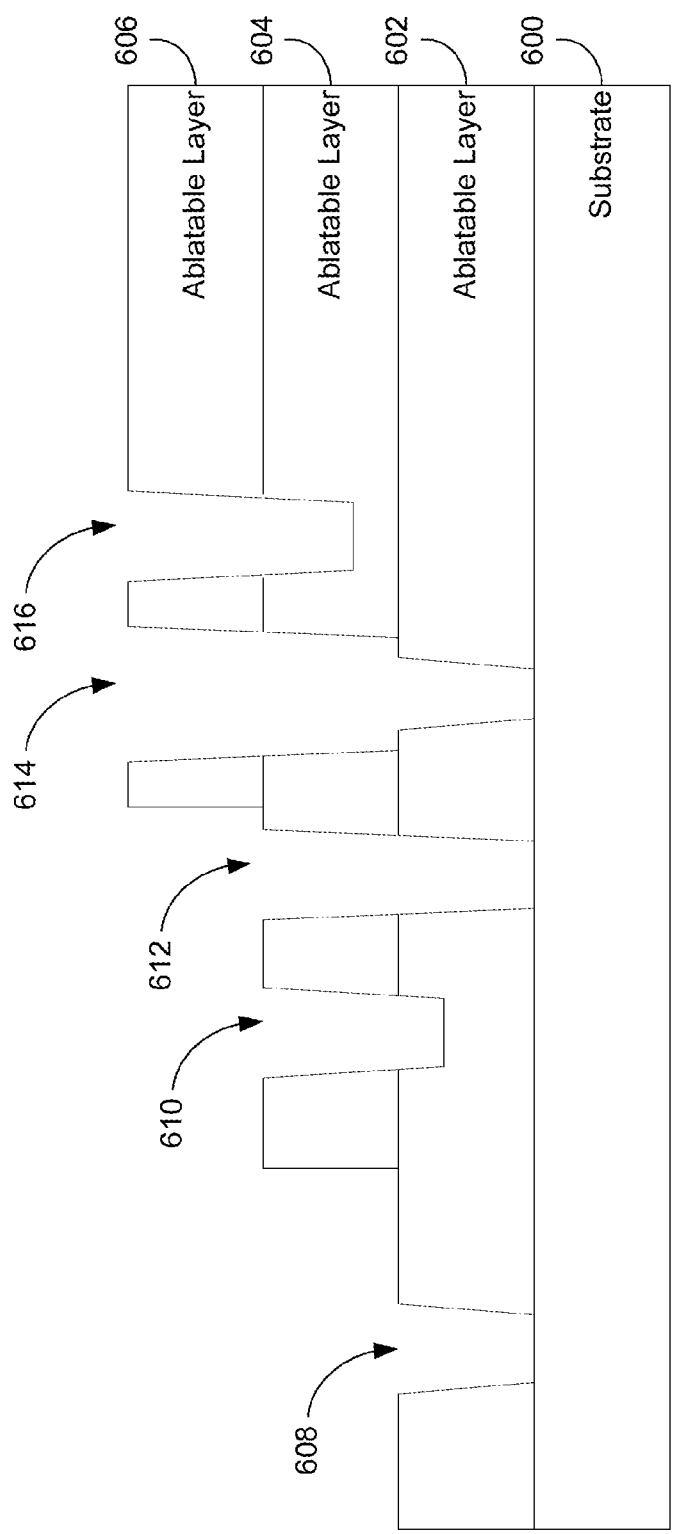
FIG. 12 is a cross-section of a substrate with multiple ablated layers from the system of FIG. 10 according to an exemplary embodiment.

Referring to FIG. 12, a cross-section of three ablatable layers 602, 604, and 606 on top of a substrate 600 is shown with various levels of ablation performed. Various portions of substrate 600 may be covered with different numbers or types of layers. An ablation 608 illustrates removal of a portion of layer 602, revealing a portion of the substrate. An ablation 610 illustrates removal of a portion of layer 604 as well as a portion of layer 602 underneath layer 604, revealing a portion of layer 602. An ablation 612 illustrates removal of a portion of layer 604 and layer 602, revealing a portion of the substrate. An ablation 614 illustrates removal of a portion of layer 606 and layer 604, initially revealing a portion of layer 602. However, a second laser beam (either from the same laser or a different laser) into the same ablation further removes a portion of layer 602, revealing a portion of the substrate. An ablation 616 illustrates removal of a portion of layer 606 and layer 604 revealing a portion of layer 604. It is noted that according to other exemplary embodiments, more or fewer than the number of layers shown here may exist on the substrate and more or fewer of the number of ablations may be present in those layers in any combination or depth.

According to one exemplary embodiment, the laser may be configured to ablate one or more layers with varying depths (e.g., by applying different amounts of energy to the layer or layers) in order to create a textured surface.

Figure 19:
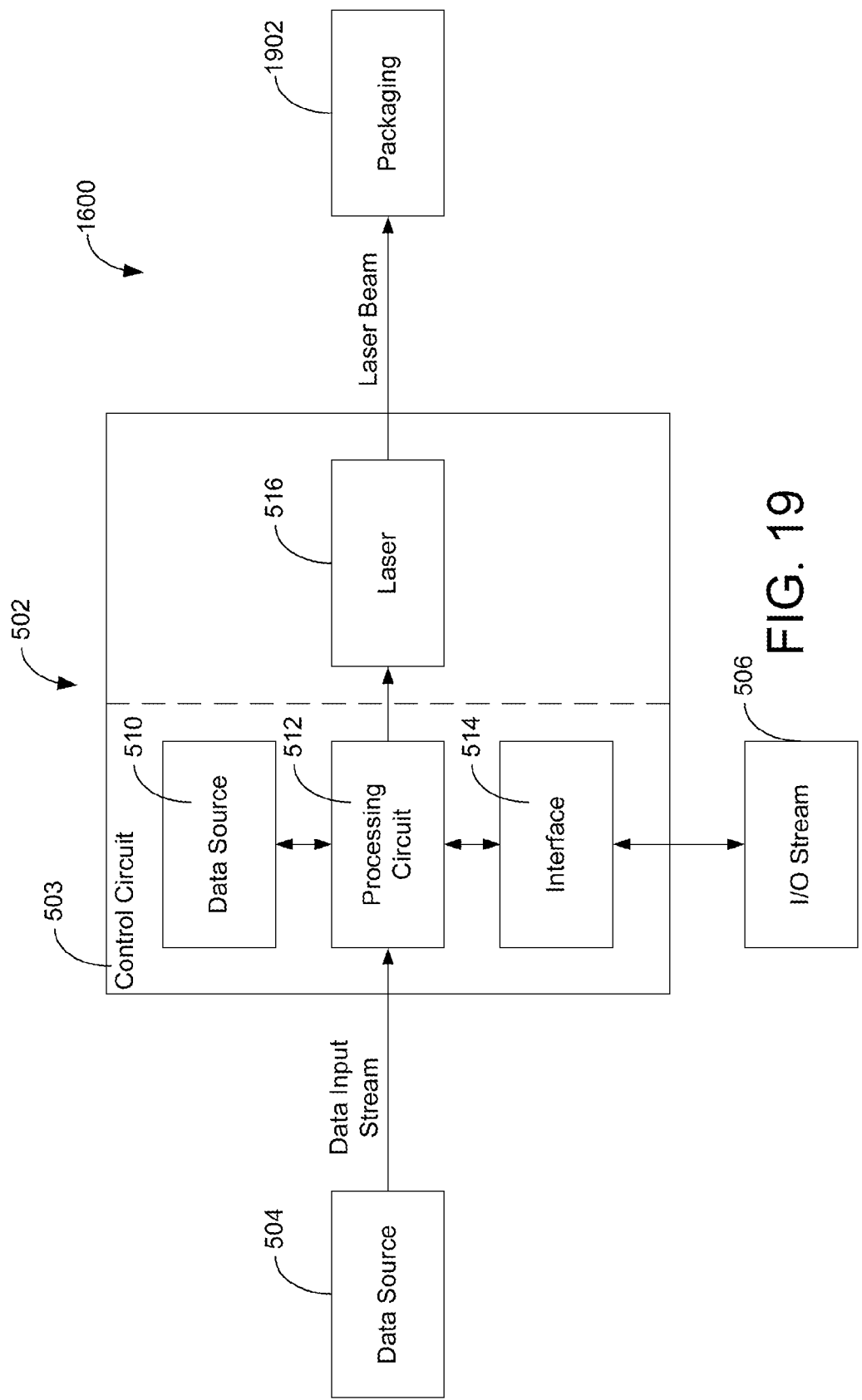
FIG. 19 is a schematic block diagram of a variable data printing system for printing on packaging according to an exemplary embodiment.

Referring to FIG. 19, an exemplary system 1900 is configured to add variable data to packaging. System 1900 may be generally similar to system 500 and include a laser printing apparatus 502, a data source 504, an input/output (I/O) stream 506, and packaging 1902. The laser printing apparatus and 502, data source 504, and I/O stream 506 may be substantially the same as in system 500, but be configured to affect a color change on packaging 1902 instead of or in addition to on a printed material or publication. Further, the power to the energy source or laser printing apparatus 502 may be controlled to be reduced or removed between printing of discrete packaging units.

Process Flows

Referring to FIG. 13, a method 700 is configured to be executed on system 500 to produce a multi-colored printed material (e.g., a signature, a book, a blown card, a pamphlet, an insert, an onsert, etc.) from a substrate having multiple overlapping layers of different colors.

At a step 702, system 500 retrieves a first data from data source 504 or 510. The first data may be fixed or variable data that can be used by system 500 to print text characters or a graphical image. At a step 704, system 500 retrieves second data from data source 504 or 510. The second data may be fixed or variable data that can be used by system 500 to print text characters or a graphical image. It is noted that according to another exemplary embodiment, the first and second data may be retrieved simultaneously, either from different memories 504 or 510 or the same data source.

At a step 706, laser 516 ablates a first of the multiple layers that has a first color using the first data. At a step 708, laser 516 ablates a second of the multiple layers that has a second color and that is beneath the first layer using the second data. This second ablation may be performed by ablating another portion of the first layer or by ablating the second layer through the first ablated portion, for example with the same laser.

Figures 20, 21, 22:
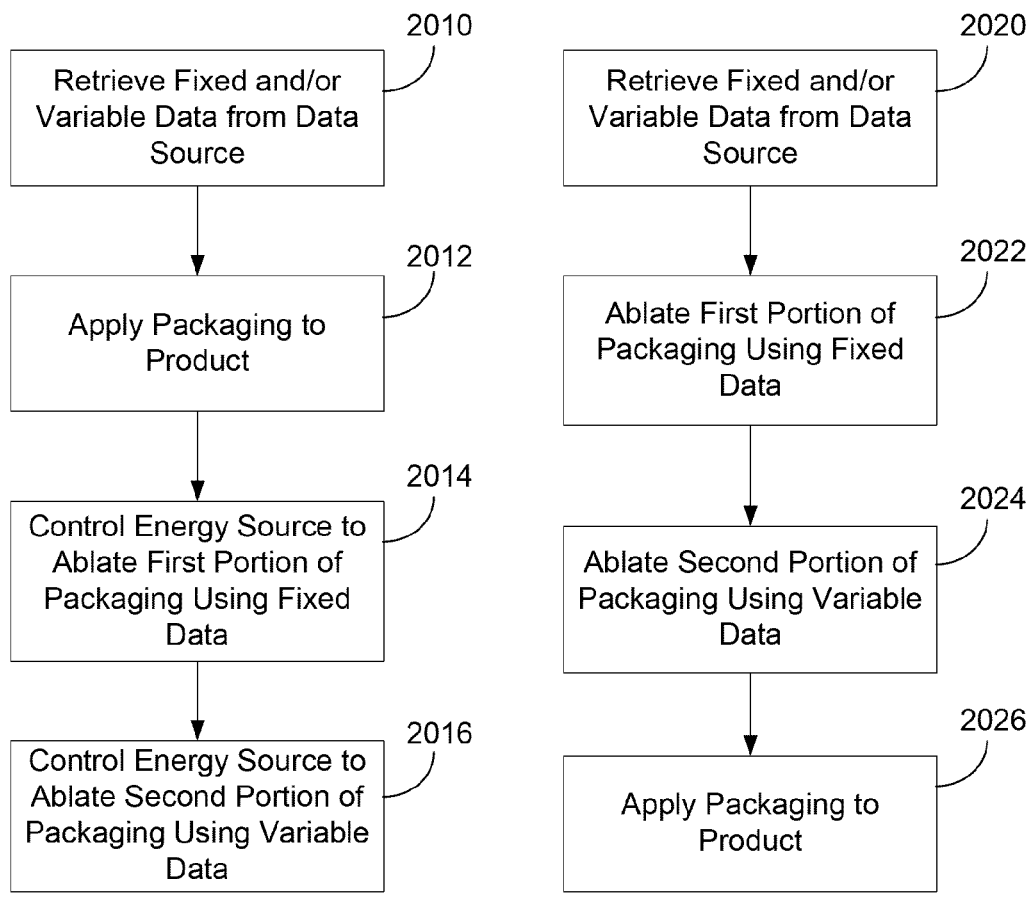
FIG. 20 is a process flow diagram of a method for printing data on packaging with the system of FIG. 19 according to an exemplary embodiment.
FIG. 21 is a process flow diagram of a method for printing data on packaging with the system of FIG. 19 according to another exemplary embodiment.
FIG. 22 is a process flow diagram of a method for printing data on packaging with the system of FIG. 19 according to another exemplary embodiment.

Referring to FIGS. 20-22, system 1900 and a packaging line may be configured to retrieve data from a data source (step 2002) and control the energy source to ablate a packaging unit (step 2004), according to various exemplary embodiments. System 1900 and the packaging line may retrieve fixed and/or variable data from the data source (step 2010), apply packaging to a product (step 2012), ablate a first portion of the packaging using fixed data (step 2014), ablate the second portion of the packaging using variable data (step 2016), etc. It is noted that the packaging may be applied at any point before, after or during printing of the fixed and/or variable data according to various exemplary embodiments. In other exemplary embodiments, the packaging may be ablated for the printing of only fixed or only variable data. In still other exemplary embodiments, the order of the printing of fixed and variable data may be different. In any of the embodiments, the packaging substrate may be ablated or one or more layers on the packaging substrate (e.g., ink layers) may be ablated.

In the embodiment of FIG. 22, at step 2020 system 1900 is configured to retrieve fixed and/or variable data from the data source. At step 2022, the system is configured to ablate a first portion of the packaging using fixed data. At step 2024, the system is configured to ablate a second portion of the packaging using variable data. At step 2026, the packaging is applied to the product in-line or off-line.

Referring to FIGS. 23-25, system 1900 and a packaging line may be configured to convey product packaging along a conveyor (step 2302), ablate the conveyed packaging using an energy source (step 2304), and apply the ablated packaging to a product (step 2306). It is noted that the packaging may be applied at any point before after or during printing of the fixed and/or variable data according to various exemplary embodiments.

In the embodiment of FIG. 24, at step 2310, a material or layer to be ablated is applied to the packaging. The material or layer may comprise any substance (e.g., ink, etc.) and may be applied using any technique (e.g., web offset printing, etc.). At step 2312, the packaging is conveyed along a conveyor. At step 2314, the energy source is controlled to ablate the material to print fixed and/or variable data. At step 2316, the ablated packaging is applied to the product. In the embodiment of FIG. 26, the packaging is applied to the product before ablation.

Referring to FIG. 14, a method 710 is configured to be executed on system 500 to perform a printing operation, for example on a printed material or publication. At a step 712, system 500 retrieves fixed data from data source 504 or 510 that may be used to print text characters or a graphical image. At a step 714, system 500 retrieves variable data from data source 504 or 510 that can be used by system 500 to print text characters or a graphical image related to geographic data or postal data. It is noted that according to another exemplary embodiment, the first and second data may be retrieved simultaneously, either from different memories 504 or 510 or the same data source. At a step 716, laser 516 ablates a first portion of at least one layer on a substrate (e.g., a sheet of paper, a continuous web of paper, etc.) using the fixed data. At a step 718, laser 516 ablates a second portion of the same layers as in step 716 using the variable data.

Additional Embodiments

Another embodiment of the disclosure relates to a method of printing. The method comprises retrieving fixed data from a data source, retrieving variable data from the data source, at least partially ablating a first portion of at least one layer of at least a first substrate with an energy source such as a laser using the fixed data, and at least partially ablating a second portion of the at least one layer of the first or a second substrate with an energy source such as a laser using the variable data.

One or more embodiments described herein may print on a first substrate comprising paper; may print based on fixed data which comprises a graphical image; may print based on variable data which comprises at least one of geographic data and postal data; may comprise first and second portions of first and second layers which are ablated to provide a printed publication; and/or may comprise substrate which is a continuous web comprising paper.

Another embodiment of the disclosure relates to a method of producing a printed material from a substrate having a plurality of overlapping layers. The method comprises retrieving first and second data from a data source, at least partially ablating a first of the layers with an energy source, such as a laser, using the first data, and at least partially ablating a second of the layers beneath the first layer with the energy source using the second data.

One or more embodiment described herein may comprise ablating the first and second layers with the same laser; may product printed material comprising a signature, a book, a blown card, a pamphlet, an insert or an onsert; may be configured such that at least one of the ablating steps produces a graphical image; may be configured such that at least one of the first and second data is variable data; may be configured such that the first and second layers are different colors; may further comprise receiving third data from the data source and ablating a third of the layers beneath the second layer with a laser using the third data, wherein the third layer is a different color than the first and second layers; and/or may be configured so that at least one of the first and second data represents an advertisement for a magazine.

Another embodiment of the disclosure relates to a method of producing a printed material from a substrate having at least one layer. The method comprises retrieving a first data from a data source and at least partially ablating the at least one layer with an energy source, such as a laser, using the first data.

Another embodiment of the disclosure relates to a system for printing on a flexible substrate. The system comprises a data source to provide data, a processing circuit, and an energy source such as a laser. The processing circuit may be configured to retrieve the data from the data source and to control the energy source to at least partially ablate a layer on the flexible substrate based on the data to form at least a portion of a printed publication on the substrate.

One or more embodiments described herein may comprise a printed publication which is a full color printed publication; may comprise a printed publication which is a magazine, catalog, newspaper or advertisement; may comprise a processing circuit configured to control the laser to ablate the flexible substrates as they travel at least about 233 feet per minute past the laser; may comprise a laser disposed on a printing line configured to print graphical images on paper to form the printed publications; may comprise a laser disposed between print units on a printing line; may comprise a laser disposed after all print units on a printing line; may comprise a laser disposed on a finishing line configured to assemble signatures into books; may comprise a laser disposed on a printer pocket; may comprise a laser disposed on a chain/gatherer; may comprise a laser configured to mark an outside page of a signature and/or an inside page of a signature; may comprise a laser disposed prior to and/or after any of the following: a binder, a trimmer, a stacker, and/or a wrapper; may comprise a laser disposed on a mailing table, a co-mailing line configured to collate different printed publications for mailing, on a pocket, combination printing/finishing line, and/or on a chain/gatherer; may comprise a laser configured to mark an outside page of a book; and/or may comprise a laser configured to mark an inside page of a signature.

One or more of the embodiments described herein may print a graphical image which is an advertisement within a magazine; may comprise a laser configured to print data associated with a retailer based on address data associated with an intended recipient of the printed publication; and/or may print variable data which comprises or is based on geographic data, demographic data, personal data, bar code data, map data, postal data, or book data.

One or more embodiments described herein may comprise a laser disposed on a co-mailing line configured to collate different printed publications for mailing; may comprise a laser configured to ablate a layer of the printed publication to produce variable data in a substantially white color; may comprise a laser configured to ablate a layer of the printed publication having an additive to facilitate ablation; may comprise a laser configured to ablate a layer having an infrared additive; may comprise a laser configured to ablate a layer of the printed publication to reveal a second layer having a characteristic selected from the group consisting of a metallic appearance, a texture, a matte finish, a glossy finish or a scent; may comprise a laser configured to ablate one or more layers of the printed publication at varying depths to provide a textured surface; and/or may comprise a fiber laser or diode array; or may comprise a laser configured to ablate a plurality of layers of the printed publication.

One or more of the embodiments described herein may comprise a printing press configured to print fixed data on the printed publications; may comprise a printing press comprising plates, wherein the plurality of versions of the printed publication are printed using the same plates but different sets of the version data; may comprise a laser disposed on a finishing line configured to bind or stitch signatures into books; may comprise a laser disposed on a printing line configured to print graphical images on paper to form the printed publications; and/or may comprise laser diode array.

One or more embodiments described herein may produce or print on printed publications comprising a signature, a book, a blown card, a pamphlet, an insert or an onsert; may comprise printing a graphical image on a paper substrate to provide the printed publications and controlling the laser to ablate the graphical image based on the variable data; may be configured such that the graphical image is an advertisement within a magazine; may comprise a laser configured to print data associated with a retailer based on address data associated with an intended recipient of the printed publication; may be configured wherein the variable data comprises geographic data, demographic data, personal data, bar code data, map data postal data, or book data; may comprise conveying the printed publications at least about 233 feet per minute past the laser; may comprise a laser controlled to ablate the printed publications with at least about 50 characters per printed publication; may comprise a laser controlled to ablate the printed publications with at least about 200 characters per printed publication; may comprise a laser disposed on a finishing line configured to bind or stitch signatures into books, a printing line configured to print graphical images on paper to form the printed publications, or a co-mailing line configured to collate different printed publications for mailing; and/or may comprise a laser configured to ablate a layer of the printed publication to produce variable data in a substantially white color.

While the exemplary embodiments illustrated in the Figures and described above are presently preferred, it should be understood that these embodiments are offered by way of example only. Accordingly, the present invention is not limited to a particular embodiment, but extends to various modifications that nevertheless fall within the scope of the appended claims. The order or sequence of any processes or method steps may be varied or re-sequenced according to alternative embodiments.

Describing the invention with Figures should not be construed as imposing on the invention any limitations that may be present in the Figures. The present invention contemplates methods, systems and program products on any machine-readable media for accomplishing its operations. The embodiments of the present invention may be implemented using an existing computer processors, or by a special purpose computer processor for an appropriate printing system, incorporated for this or another purpose or by a hardwired system.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. For example, the teachings herein may be applied to the packaging field where print is applied. These printed materials also may be ablated as described herein. The embodiments were shown and described in order to explain the principals of the invention and its practical application to enable one skilled in the art to utilize the invention in various embodiments and with various modifications as are suited to the particular use contemplated.

What is claimed is:

1. A method of adding data to a printed publication printed on a substrate by a commercial printing press, comprising:
   receiving variable data changed between at least two copies of the printed publication; and
   controlling an energy source to at least partially ablate the printed publication based on the variable data;
   wherein an image is printed on the substrate using the commercial printing press based on fixed data common to the at least two copies of the printed publication; and
   wherein controlling the energy source to at least partially ablate the printed publication comprises, after the image has been at least partially printed on the substrate by the commercial printing press based on the fixed data, controlling the energy source, based on the variable data, to remove a portion of the image previously printed on the substrate by the commercial printing press.

2. The method of claim 1, wherein the printed publication comprises a signature, a book, a mail piece, a blown card, a pamphlet, an insert or an onsert.

3. The method of claim 1, wherein the energy source comprises a co2 laser, a fiber laser, or a laser diode array.

4. The method of claim 3, wherein the energy source is configured to ablate a layer of the printed publication to produce data in a substantially white color.

5. The method of claim 1, wherein controlling the energy source to at least partially ablate the printed publication comprises controlling the energy source to print data associated with a retailer based on address data associated with an intended recipient of the printed publication.

6. The method of claim 1, wherein the printed publication has been printed with a graphical image, and wherein controlling the energy source to at least partially ablate the printed publication comprises controlling the energy source to ablate and remove a portion of the graphical image based on the variable data.

7. The method of claim 1, wherein controlling the energy source to remove a portion of the printed publication based on the variable data comprises controlling the energy source to remove the portion of the printed publication and expose a surface of the substrate.

8. The method of claim 1, wherein controlling the energy source to at least partially ablate the printed publication comprises controlling the energy source to at least partially ablate the printed publication in-line with a flow of the printed publication through the commercial printing press.

9. The method of claim 8, wherein the energy source is disposed on a printing line on which the substrate travels during printing by the commercial printing press and is positioned either within the commercial printing press or after the commercial printing press along the printing line.

10. The method of claim 1, wherein the energy source is disposed on a processing line separate from a printing line on which the substrate travels during printing by the commercial printing press, and wherein controlling the energy controlling the energy source to at least partially ablate the printed publication comprises controlling the energy source to at least partially ablate the printed publication in-line with a flow of the printed publication through the processing line.

11. A system for adding data to a printed publication printed on a substrate, comprising:
   a processing circuit; and
   an energy source;
   wherein the processing circuit is configured to receive variable data and to control the energy source to at least partially ablate the printed publication based on the variable data changed between at least two copies of the printed publication;
   wherein an image is printed by a commercial printing press as the substrate travels through the commercial printing press based on fixed data common to the at least two copies of the printed publication; and
   wherein, after the image has been at least partially printed on the substrate by the commercial printing press based on the fixed data, the processing circuit is configured to control the energy source, based on the variable data, to remove a portion of the image previously printed on the substrate by the commercial printing press.

12. The system of claim 11, wherein the energy source is configured to print data associated with a retailer based on address data associated with an intended recipient of the printed publication.

13. The system of claim 11, wherein the laser comprises a co2 laser.

14. The system of claim 11, wherein the commercial printing press is a web offset printing press, and wherein the publication is printed by the web offset printing press as the substrate travels through a plurality of print units of the web offset printing press.

15. The system of claim 11, wherein the printed publication comprises a signature, a book, a blown card, a mail piece, a pamphlet, an insert or an onsert, and wherein the printed publication has been printed with a graphical image and the processing circuit is configured to control the energy source to ablate and remove a portion of the graphical image based on the variable data.

16. The system of claim 11, wherein the processing circuit is configured to control the energy source to ablate the printed publication in-line with a flow of the printed publication through the commercial printing press.

17. The system of claim 16, wherein the energy source is disposed on a printing line of the commercial printing press, and wherein the processing circuit is configured to control the energy source to at least partially ablate the printed publication at a speed substantially the same as an operating speed of the commercial printing press at which the substrate travels through the commercial printing press while the printed publication is printed.

18. The system of claim 11, wherein the processing circuit is configured to remove a portion of the printed publication based on the variable data and expose a surface of the substrate.

19. A printed publication generated using a process of:
   receiving variable data changed between at least two copies of the printed publication; and
   controlling an energy source to at least partially ablate the printed publication based on the variable data;
   wherein an image is printed on the substrate using the commercial printing press based on fixed data common to the at least two copies of the printed publication; and
   wherein controlling the energy source to at least partially ablate the printed publication comprises, after the image has been at least partially printed on the substrate by the commercial printing press based on the fixed data, controlling the energy source, based on the variable data, to remove a portion of the image previously printed on the substrate by the commercial printing press.

20. The printed publication of claim 19, wherein the printed publication has been printed with a graphical image, and wherein controlling the energy source to at least partially ablate the printed publication comprises controlling the energy source to ablate and remove a portion of the graphical image based on the variable data.

* * * * *